United States Patent [19]
Resnicow

[11] Patent Number: 4,704,553
[45] Date of Patent: Nov. 3, 1987

[54] CONTROLLED ELECTRIC DRIVE DEVICE

[76] Inventor: Herbert Resnicow, 107 Weeks Rd., East Williston, N.Y. 11596

[21] Appl. No.: 807,944

[22] Filed: Dec. 12, 1985

Related U.S. Application Data

[63] Continuation of Ser. No. 320,808, Nov. 12, 1981, abandoned.

[51] Int. Cl.[4] .............................................. H02K 41/00
[52] U.S. Cl. ...................................... 310/12; 310/27; 310/13
[58] Field of Search ..................... 310/12–14, 310/27, 154, 266, 268, DIG. 6

[56] References Cited

U.S. PATENT DOCUMENTS

| | | | |
|---|---|---|---|
| 2,781,461 | 2/1957 | Booth et al. | 310/27 |
| 3,109,113 | 10/1963 | Henry-Baudot . | |
| 3,136,934 | 6/1964 | Henry-Baudot . | |
| 3,259,768 | 7/1966 | Burr . | |
| 3,416,535 | 12/1968 | Kalthoff et al. | 310/132 |
| 4,187,453 | 2/1980 | Rough | 310/134 |
| 4,227,793 | 1/1981 | Rough . | |
| 4,318,038 | 3/1982 | Munchiro . | |

Primary Examiner—Donovan F. Duggan
Attorney, Agent, or Firm—Bradford E. Kile

[57] ABSTRACT

A controlled electric drive (CED) device comprises a pair of rectangular magnetic poles of different polarity arranged adjacent, parallel, and congruent to each other with a relatively narrow gap therebetween, providing an essentially uniform magnetic field between the pole faces. The device further comprises a driver conductor arranged to move freely between the magnetic pole faces in such a manner that an electric current running through the driver conductor will tend to move the conductor out of the magnetic field at right angles to the conductor and to the direction of the magnetic lines of force defining the magnetic field. The device further comprises a controller conductor wound in a flat, essentially rectangular spiral fixed adjacent to, and insulated from, the driver conductor. The controller conductor is so arranged that its longitudinal direction is parallel to the driver conductor, and has first and second portions, with direct current flowing in opposite directions in each of the portions. Further, there is provided a multiplicity of controllers comprising single conductors, multiple conductors, rectangular magnets, shaped magnets, and shaped magnetic gaps. Finally, a plurality of such CED devices can be arranged in various arrays so as to provide for the tracing of complex patterns.

26 Claims, 32 Drawing Figures

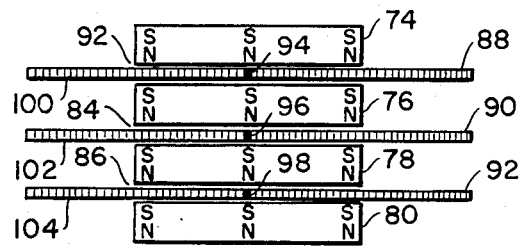
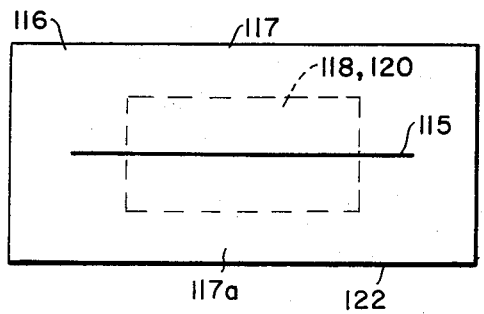
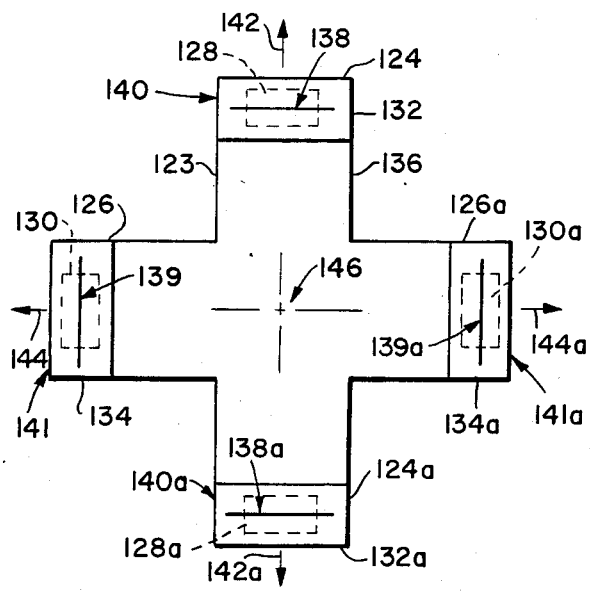
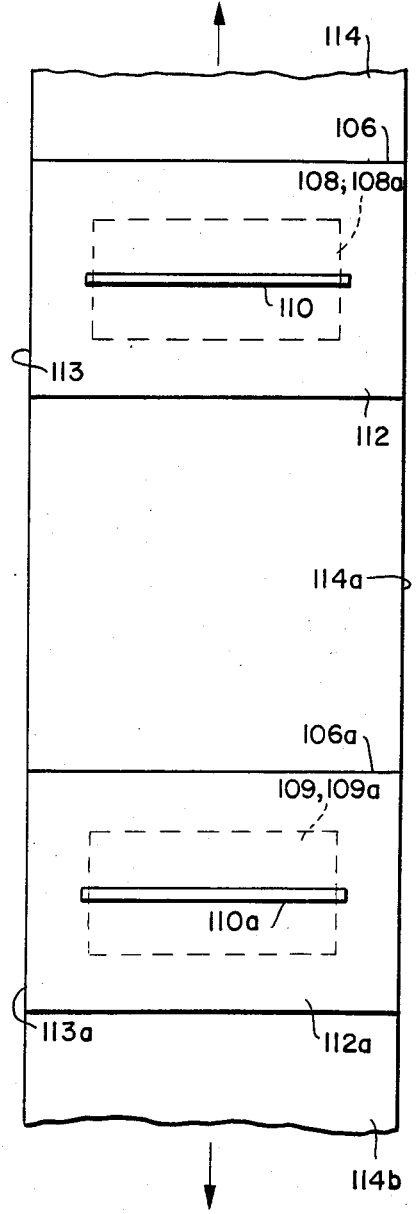

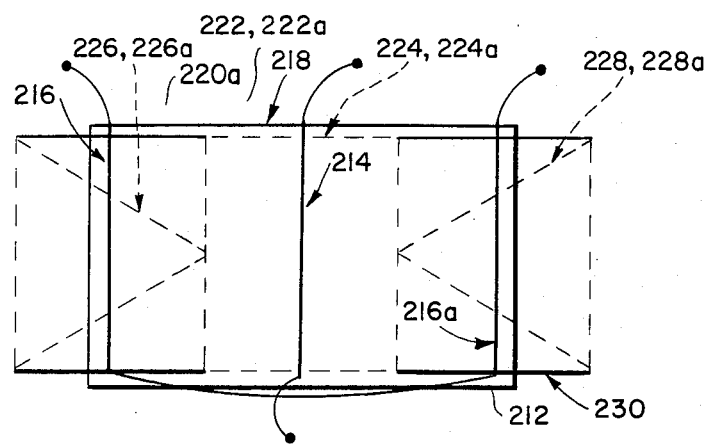
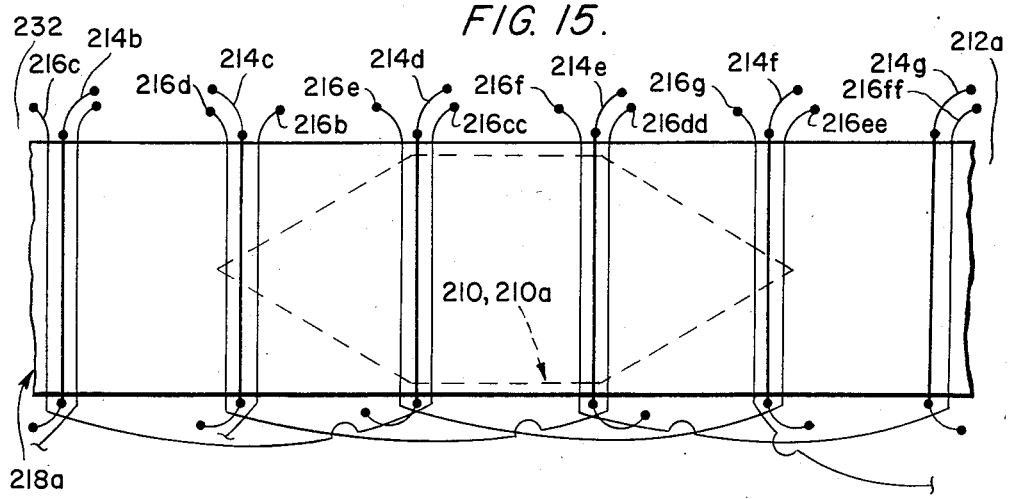
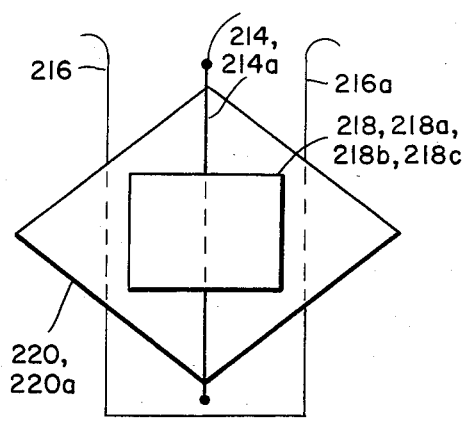
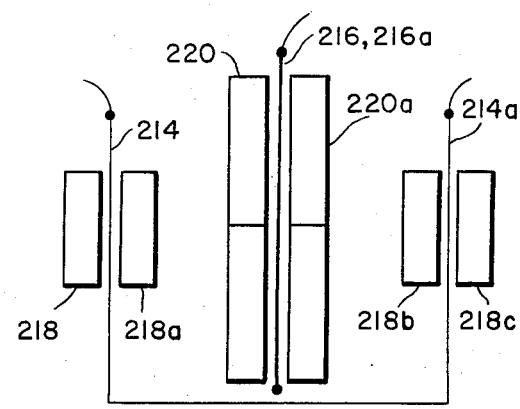

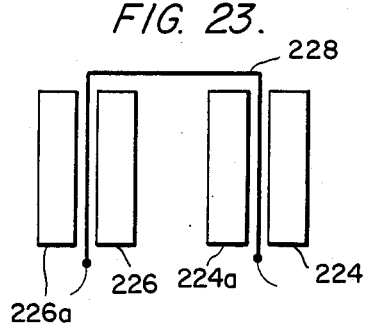
FIG. 23.
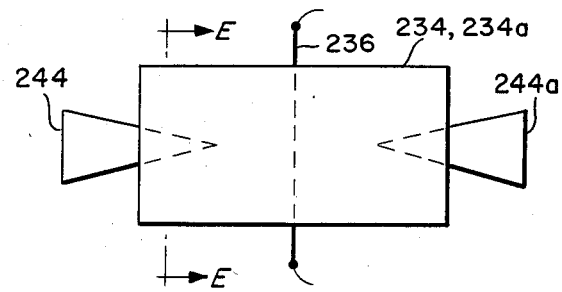
FIG. 24.
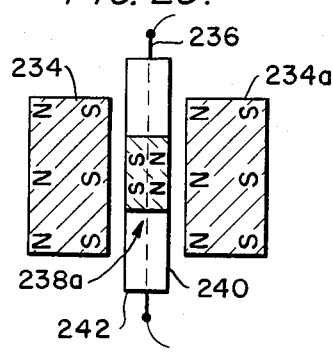
FIG. 25.
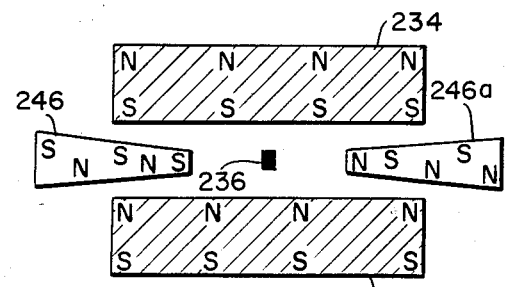
FIG. 26.
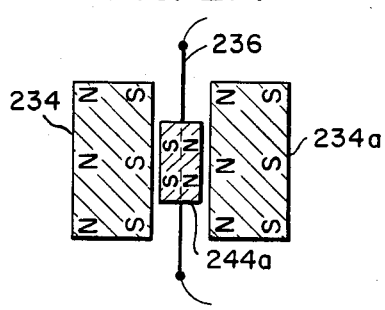
FIG. 27.
FIG. 28.
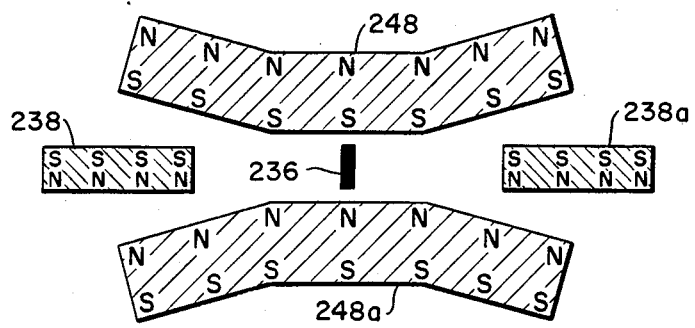
FIG. 29.

CONTROLLED ELECTRIC DRIVE DEVICE

DESCRIPTION

This is a continuation application of U.S. patent application Ser. No. 06/320,808 filed 11-12-81, now abandoned.

TECHNICAL FIELD

The present invention relates to a controlled electric drive (CED) device, and more particularly to a device comprising a true electric spring for producing controlled direct translatory linear, planar or three-dimensional motion from an electric current without use of a conventional rotary motor or a mechanical device to transfer rotary motion into translatory motion. Thus, in the CED device of the present invention, spring motion depends on electrical characteristics, rather than on elastic properties of spring material.

BACKGROUND ART

Prior to the development of the CED device, prior art practitioners employed mechanical devices which were powered by conventional rotary electric motors. Such devices were typically inflexible, mechanically complex, bulky, heavy, noisy, costly, energy-inefficient, subject to wear, and incapable of producing precisely controlled, very rapid movement. Furthermore, attempts to overcome the disadvantages of such mechanical devices by development of electric devices resulted in inefficiency of operation, as well as in undesirable size and cost of the device. In addition, the various disadvantages pointed out above were not satisfactorily eliminated.

Electrical translatory devices, such as solenoids and reed relays, proved inflexible in that they were unable to control their movements, other than by mechanical springs or stops. Such inflexibility of the prior art devices also manifested itself in the form of an inability to accomplish sophisticated movements, such as complex planar or three-dimensional curves. Finally, the prior art devices were hampered by operational disadvantages, including overshoot, hunting and ringing. Such devices were generally used in an on-off mode.

Arrangements of the prior art have included a mechanical spring. However, the mechanical spring is burdened with the following drawbacks: the spring constant is not constant over the full range of possible tension or compression of the spring; the spring constant is not the same in tension as it is in compression; the spring constant changes with age and mechanical fatigue; the spring constant cannot be varied at will; and the spring resistance cannot be completely eliminated, making it necessary either to apply force continuously or to use a locking mechanism to maintain a desired displacement position.

DISCLOSURE OF THE INVENTION

According to the present invention, there is provided a controlled electric drive (CED) device, and more particularly a device comprising a true electric spring. The inventive CED device converts electric current into accurately controlled, simple and complex translatory and rotary motion, which may be linear, planar or three-dimensional, without the use of a conventional rotary motor or a mechanical device to transform rotary motion into translatory motion, and without the use of mechanical stops, springs, or brakes. In such a device, spring action is a function of a repeatable, controllable and infinitely variable electrical input, and of electrical characteristics, rather than of elastic properties of spring material.

In addition, the device of the present invention is able, when employed with a cutting edge, needle or marker, etc., to perform cutting, piercing, marking or similar operations in accordance with a desired shape, size and/or depth, at a desired speed of movement, and with a very high degree of accuracy.

In contrast to the mechanical spring described above, the device of the present invention comprises an electrical spring used to control motion of an armature, and has the following inherent advantages: it has a spring constant which is uniform over the whole range of motion of the armature; it is the same in both "tension" and "compression" (movement in one direction or in the opposite direction); the spring constant does not change due to age or fatigue of materials: the spring constant can easily be infinitely varied, by usual and well-known means, from zero (complete absence of resisting force, accomplished by turning off the current) to the maximum steady-state resistance (based on the maximum spring constant for a particular device), variation of the spring constant being accomplished by increasing the current to the maximum amperage permitted by the constant use, or the intermittent use (as the case may be), heat dissipating ability of the assembly.

Furthermore, in the device of the present invention, a specific spring constant can be reinstated at will, after change or shut-off, by providing to the device an amperage of current identical to that dictated by previous calibration of the device. In addition, the spring constant can be (automatically) made very great for short periods of time in order to accommodate sudden great overloads of applied force, such being accomplished without harm, provided that the current and/or duration of current flow are kept below destructive limits.

A preferred embodiment of the CED device of the present invention comprises a pair of congruent, planar, rectangular magnetic pole faces of different polarities, arranged adjacent and parallel to each other so as to have a relatively narrow gap therebetween, in which there is disposed an essentially uniform magnetic field having relatively small and equal spillage of magnetic force lines at the edges of the pole faces. The device of the present invention further includes a straight driver conductor centered in the gap between the magnetic pole faces and parallel to one pair of pole face edges, and arranged to move freely in a direction perpendicular to itself so that a direct electric current energizing the driver conductor tends to move the driver conductor out of the magnetic field at right angles to the driver conductor and to the magnetic lines of force. The direction of said motion, towards one or the other of the pair of magnetic pole face edges (which are parallel to the driver conductor), depends on the direction of current flow in the driver conductor. The electrical leads connected to the driver conductor are also connected to a source of direct current which may be reversed as to the direction of its current flow, and which may be varied in voltage and amperage. Finally, the device of the present invention includes a controller conductor, which is fixed adjacent to the driver conductor, and which is in the form of a flat, planar, generally rectangular, continuous spiral centered on the driver conductor as a former, with a multiplicity of turns insulated from the driver conductor and from each other, the longitudinal turns on either side of the driver conductor being parallel to the driver conductor. There are sufficient turns so that a portion of the longitudinal turns, on either side of the driver conductor, extends outside the magnetic field between the magnetic pole faces. The electrical leads of the controller conductor are connected to a source of direct current which is separate and distinct from that of the driver conductor. The controller current source may be varied in voltage and amperage, and the direction of current flow is such that each of the parallel portions of the controller conductor, on either side of the driver conductor, tends to move out of the magnetic field in a direction away from the other portion, and away from the driver conductor. The driver conductor and the parallel longitudinal portions of the controller conductor flanking the driver conductor are sufficiently longer than the width of the rectangular magnetic pole faces, all measured in a direction parallel to the driver conductor, so that the straight portions of the controller conductor and of the driver conductor will be within the magnetic field throughout the entire range of movement of the armature. The armature comprises the driver conductor and the controller conductor, and a drive bar may be fixed to the armature to transmit motion to an operating element.

Whereas the above describes the basic linear CED device of the present invention, various embodiments are disclosed below. For example, in one embodiment, the driver and the controller are separated from each other, and are connected by a drive bar, the driver and controller each having its own magnet pair. In accordance with a further feature of the invention, pairs of controllers are fixed to each other, with an intervening drive bar fixed to a driver being provided.

CED devices may be, in accordance with a further embodiment of the invention, stacked or arrayed in tandem to provide greater force. CED devices may also be arranged in pairs, at right angles to each other, to provide complex planar motion. A CED device also may be fixed to a planar array to provide three-dimensional motion. CED devices additionally may be arranged in complex geometric arrays.

The magnets of CED devices of the present invention may be of a shape other than rectangular shape, such as disc or annular ring shape, to provide varied desired motions. CED devices may be simply curved into the shape of cylinders, or doubly curved to provide spherical motion. Controllers of devices of the invention may be single wires, spirals. rectangular magnets or other shaped magnets. Stator magnets may be rectangular, triangular, or otherwise shaped, or may be formed in a combination of shapes. Magnetic gaps may be rectangular, or of other shape, in cross-section.

Therefore, it is the primary object of the present invention to provide a controlled electric drive (CED) device, and more particularly to provide a device comprising a true electric spring for accurately controlling the motion of an electrically driven device or other moving device, so as to provide complex, rapid and direct translatory, rotary or three-dimensional motion in response to the application of an electric current or other source of energy or force, such motion being achieved directly, without the use of a conventional rotary motor or mechanical device to transform rotary motion into translatory motion, or other complex motions.

It is an additional object of the present invention to provide a device with increased flexibility of operation, that is, a device which is capable of producing complex translatory, rotary, planar and three-dimensional motion, executed in a precise, rapid and efficient manner.

It is an additional object of the present invention to provide a device which is relatively light and compact, which is easy and economical to manufacture, using relatively little material and being made by standard manufacturing processes, and which is energy efficient, using less energy than prior art devices used to accomplish a particular motion, using almost no energy when not in actual motion, and using no energy to hold position in a non-equilibrium location.

It is an additional object of the present invention to provide a device which is capable of following a complex, rapidly changing electrical input having a wide range of amplitudes and directions of current flow, so as to provide accurately controlled and complex motion, not within the capability of prior art devices, without being burdened by hunting, overshoot or ringing.

It is an additional object of the present invention to provide a device which, when equipped with a cutting edge, needle, marker or other tool or instrument, is able to cut, penetrate, punch or mark, or otherwise perform useful functions, in accordance with any desired size, shape, pattern or depth, at a desired speed, and with desired accuracy.

BRIEF DESCRIPTION OF DRAWINGS

FIG. 3 is a sectional view of a stacked array of CED devices.

FIG. 4 illustrates a tandem array of basic linear CED devices.

FIG. 5 is a schematic plan view of an elongated basic CED, with the driver and controller being lengthened with respect to the magnet pair.

FIG. 6 is a schematic plan view of four elongated CED devices, with the armatures being fixed together in the form of a cross so as to provide planar motion.

FIG. 14 is a plan view of a shaped-stator-magnet CED with the controllers in reverse mode.

FIG. 15 is a plan view of a continuous shaped-stator-magnet CED.

FIG. 16 is a plan view of a compact shaped-stator-magnet CED.

FIG. 17 is a right-hand view of the compact shaped-stator-magnet CED of FIG. 16.

FIG. 23 is a left-hand view of the CED of FIG. 20.

FIG. 24 is a plan view of a magnet-controller CED.

FIG. 25 is a sectional view of the CED of FIG. 24, the sectional view being taken along section D—D.

FIG. 26 is a plan view of a shaped-magnet-controller CED.

FIG. 27 is a sectional view of the shaped-magnet-controller CED of FIG. 26, the sectional view being taken along section E—E.

FIG. 28 is a sectional view of a shaped-cross-section-magnet-controller CED.

FIG. 29 is a sectional view of a shaped-magnetic-gap controller-magnet CED.

BEST MODE FOR CARRYING OUT THE INVENTION

The invention of the application will now be more fully described with reference to FIGS. 1 and 2, which are a top plan view and a sectional view. respectively, of the CED device of the present invention.

Figure 1:
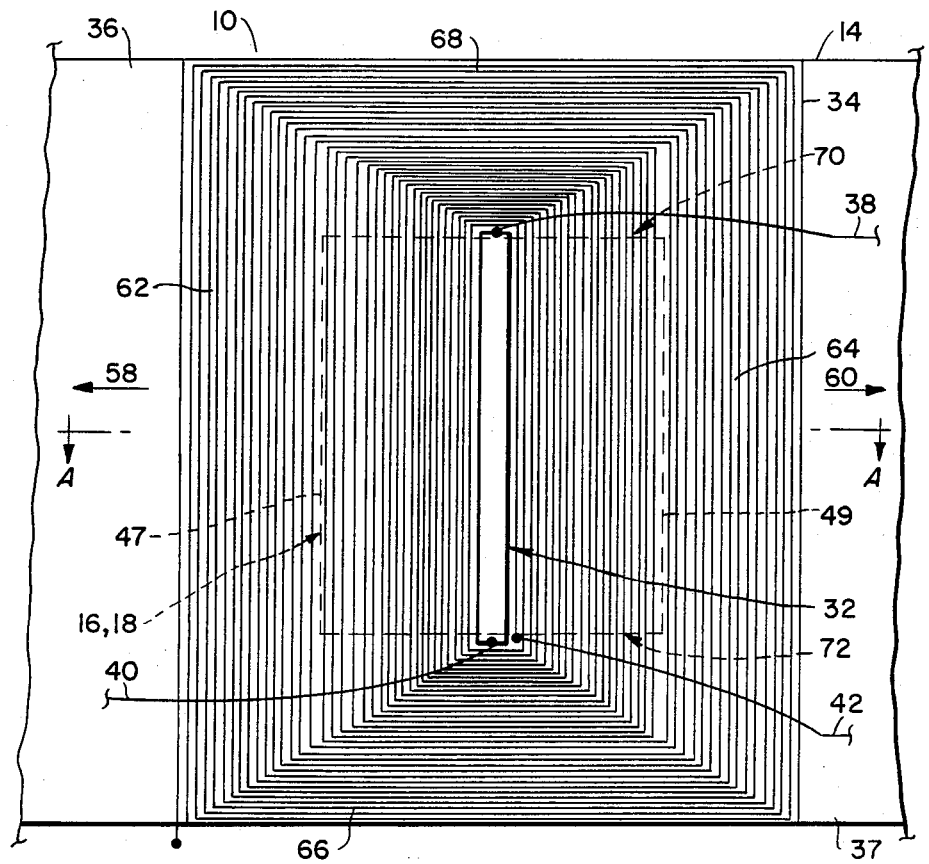
FIG. 1 is a top view of the basic linear CED device of the present invention.
Figure 2:
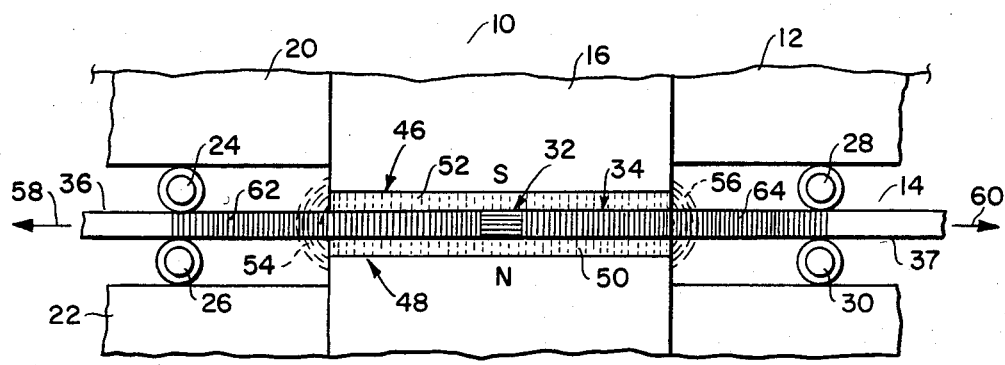
FIG. 2 is a sectional view of the basic linear CED device of the present invention, said sectional view being taken along section A—A of FIG. 1.

As seen in FIGS. 1 and 2, the basic linear controlled electric drive (CED) device 10 comprises a stator 12 and an armature 14. The stator 12 comprises a pair of magnetic poles 16 and 18 (shown dotted in FIG. 1, for clarity), support framework 20 and 22, and roller guides 24, 26, 28 and 30. The armature 14 comprises a driver 32, a controller 34, drive bars 36 and 37, driver leads 38 and 40, and controller leads 42 and 44.

More specifically, a pair of magnetic poles 16 and 18, with planar, rectangular pole faces 46 and 48, is arranged so that the individual poles 16 and 18 thereof are adjacent to each other in attractive relationship. The pole faces 46 and 48 are parallel and congruent with respect to each other so as to have a relatively narrow magnetic gap 50 formed therebetween, with an essentially uniform magnetic field 52 being provided in the gap 50, and with relatively small and equal spillages 54 and 56 of magnetic lines of force occurring at the ends of the gap 50. The poles 16 and 18 may, in accordance with the subject invention, be permanent magnets, electromagnets, pole pieces, or the like.

The driver 32 is an electrical conductor, which is, preferably, of rectangular cross-section and of laminated construction, and which is arranged between, and preferably equidistant from, the pole faces 46 and 48. The long axis of the driver 32 is parallel to the respective edges 47 and 49 of the pole faces 46 and 48, so that the driver 32 may move freely along the directions indicated by arrows 58 and 60. The driver 32 is energized by means of the pair of electrical leads 38 and 40 connected thereto, the leads 38 and 40 being also connected to a source of direct current which is adjustable as to its intensity and/or polarity by usual and well-known means.

An electrical current passing through driver 32 tends to move driver 32 out of the magnetic field 52, in a direction perpendicular to the long axis of driver 32, and also in a direction perpendicular to the direction of the magnetic lines of force of the magnetic field 52. The direction of movement of driver 32 is indicated by either arrow 58 or arrow 60 (in FIG. 2), depending on the direction of current flowing through driver 32. Presuming a constant strength of magnetic field 52, and a constant fixed length of the conductor of driver 32 within the magnetic field 52, the force exerted on the driver 32 (which results from the interaction of the magnetic field 52 with the current flowing in the driver 32) is directly proportional to the amperage of current flowing through driver 32.

A controller 34 is fixed adjacent to the driver 32, the controller 34 being an electrical conductor, preferably of flat wire or foil, arranged in the form of a planar, generally rectangular spiral centered on the driver 32, as a former, with a multiplicity of turns electrically insulated from each other and from the driver 32. The conductor turns of the portions 62 and 64 of the controller 34 either are within the magnetic influence of the magnetic field 52 and the spillages 54 and 56, or can move into these areas in the normal operation of this preferred embodiment of the invention. Moreover, the conductor turns are spaced uniformly apart, preferably in direct contact with each other, with the first inner turn being in direct contact with the driver 32. More specifically, the turns are disposed on either side of, and parallel to, the driver 32, and are additionally parallel to the edges 47 and 49 of pole faces 46 and 48, respectively. Preferably, the same number of conductor turns are present in each portion 62 and 64, so that the mass of controller 34 is equally distributed on either side of the driver 32, and the restoring spring forces derived from the conductor turns of the controller 34 are equally distributed on either side of the driver 32.

The controller 34 may be energized by a pair of electrical leads 42 and 44 connected thereto, and also connected to a direct current source of fixed polarity, which source may be varied as to its voltage and amperage by usual and well-known means. The direction of current flow in the controller 34, with respect to the polarity of the magnetic field 52, is such that the interaction of the current flowing in the conductor turns of portion 62 with the magnetic field 52 tends to move portion 62 out of magnetic field 52 in the direction shown by arrow 58, that is, away from the driver 32 and portion 64. Since the controller 34 is a spiral formed of a single continuous conductor, the direction of current flow in the conductor turns of portion 64 is, with respect to magnetic field 52, opposite to the direction of current flow in the conductor turns of portion 64, so that the interaction of the current flowing in the conductor turns of portion 64 with the magnetic field 52 will tend to move portion 64 out of magnetic field 52 in the direction shown by arrow 60, and away from the driver 32 and the portion 62. When the driver 32 is centered at the middle axis of the magnetic poles 16 and 18, as shown, there are an equal number of conductor turns of portion 62 and of portion 64 in the magnetic field 52, and, since the magnetic poles 16 and 18 are rectangular, there are equal lengths of conductor turns of portions 62 and 64 in the magnetic field 52. Since the controller 34 is a single continuous conductor, the same current flows in each conductor turn of portions 62 and 64, and the force which tends to move portion 62 in the direction indicated by arrow 58 is equal and opposite to the force which tends to move portion 64 in the direction indicated by arrow 60. These forces are then in equilibrium, and, since the controller 34 and the driver 32 are fixed to each other, and to drive bars 36 and 37, the armature 14 is in equilibrium. Moreover, the armature 14 is constrained by roller guides 24, 26, 28 and 30, or by other usual and well-known means, to move only in the directions shown by arrows 58 and 60.

Should the armature 14 be displaced by an outside force in the direction shown by arrow 58, the number of conductor turns of portion 62 within, and interacting with, the magnetic field 52 and spillage 54 will be fewer than in the equilibrium position, in direct proportion to the amount of the displacement of armature 14. In a similar manner, the number of conductor turns of portion 64, within, and interacting with magnetic field 52 and spillage 56, will be greater than in the equilibrium position, and will be in direct proportion to the amount of displacement of armature 14. By symmetry, the increase in the number of effective conductor turns (those within the influence of magnetic lines of force) of portion 64 will be exactly the same as the decrease in the number of effective conductor turns of portion 62, so that the force due to the current in controller 34, which tends to move the armature 14 in the direction of arrow 58, will be decreased in proportion to the displacement of armature 14. Moreover, the force tending to move armature 14 in the direction of arrow 60 will be increased in proportion to the displacement of armature 14 from the equilibrium position. The restoring force, corresponding to the resultant of the forces acting on the armature 14, will tend to move the armature 14 back to the central equilibrium position, and this restoring force will be directly proportional to the displacement of the armature 14. It is clear that a force applied to the armature 14, in the direction of arrow 58, will displace the armature 14 in the direction shown by arrow 58 until the restoring force (resulting from the imbalance of the forces acting on the armature 14, due to the increase and decrease, respectively, of the number of conductor turns of portions 64 and 62 interacting with the magnetic lines of force) exactly balances the displacing force.

In other words, the displacement of armature 14 is directly proportional to the displacing force applied to armature 14. For specific physical dimensions of magnetic pole faces 46 and 48, magnetic gap 50 and controller 34, and for fixed magnetic strength of magnetic poles 16 and 18, the restoring force exerted by the controller 34, in resisting the displacement of the armature 14, is directly proportional to the amperage of the current flowing in the conductor of the controller 34. For a specific amperage of current flowing in the controller 34, a specific applied displacing force will produce a proportional specific displacement within the full range of amplitude of motion of the armature 14, and a specific incremental increase or decrease of applied displacing force will produce a directly proportional incremental increase or decrease of displacement. For a specific set of physical characteristics and a specific amperage of current in the controller 34, the applied displacing force required to move the armature 14 a unit of distance may be considered a measure of the "spring constant" of the device in a manner analogous to the determination of the spring constant of a mechanical spring, such as a coiled wire spring.

For some applications of this embodiment of the CED device of the present invention, wherein external forces are applied, the driver 32 need not be used, or the driver 32 may be used only to resist or balance out all, or a portion, of an external applied force. In the preferred embodiment, the displacing force applied to the armature 14 is supplied by energizing the driver 32 by application of an electrical current to the leads 38 and 40. For a fixed set of physical and magnetic characteristics of a particular CED device 10, the force exerted by driver 32 on the armature 14 is directly proportional to the amperage of the current in driver 32, and the direction of the force applied to armature 14 by driver 32, in the direction shown either by arrow 58 or by arrow 60, is a function of the direction of current flow in driver 32. It is clear that, for a specific current flow in controller 34 (that is, a specific "spring constant"), the armature 14 can be moved accurately and rapidly to any desired position within the full range of movement allowed by the device, with an infinite number of possible positions, and with full repeatability of position, by controlling the direction and intensity of the current flow in driver 32. It is also clear that, once a desired position has been achieved, if both currents (those in the controller 34 and in the driver 32) are shut off simultaneously (making due provision for back EMF due to collapsing magnetic fields in the conductors), the armature 14 will remain in the desired position for an unlimited time without further expenditure of energy. In addition, the device may be quickly reactivated for movement to a new position and deactivated, again and again, or may be returned to the equilibrium position quickly and accurately by switching off the current to the driver 32, but not the current to the controller 34.

Furthermore, complex motions and reciprocating motions are easily and accurately produced in accordance with the invention. The current in the driver 32 may be applied slowly, rapidly, or in a varying pattern and/or direction, to achieve any desired pattern of motion. The magnitude of the force transmitted to a tool fixed to the drive bar 36 and 37, and the speed of application of this force, as well as the amplitude of the motion and the pattern of motion, can be controlled by selecting the appropriate amperage for the current in the controller 34 and the driver 32, and the rise time and pattern of the application of these currents.

In normal use, the movement of the armature 14 is quite fast, being a function of the currents and masses involved. Since the device is relatively light, compared to the forces resulting from the currents which may be carried, and since there are no mechanical devices in the chain of movement to slow down the movement by friction or unnecessary mass, the movements achieved in the inventive CED device will be faster than in comparable mechanical devices. If greater than normal speed is required, the current in the controller 34 may be switched off until the armature 14 is almost in the desired position, whereupon it may be switched on again. Further, the current to the driver 32 may be initially rapidly increased far beyond that needed to achieve the desired displacement, and then rapidly reduced, or even momentarily reversed (to give a braking effect), just before the desired position is achieved, whereupon the appropriate current may then be applied to the driver 32.

Finally, when even more rapid response is required, the current in the controller 34 may be momentarily reversed in direction immediately after the start of motion of the armature 14, so that the imbalance of forces in the portions 62 and 64 of the controller 34 tend to apply force in the same direction as the current in the driver 32, rather than oppose its movement. Then, when the desired displacement is almost reached, the direction of the current flow in the controller 34 is suddenly reversed as to its normal direction of flow, and may even be momentarily increased, to give a stronger braking effect, and to reduce potential overshoot of position. Thus, it is clear that a great many types and velocities of motion may be achieved by controlling and varying the amplitude, direction, speed of application, and pattern of application of the electric current to the driver 32 and to the controller 34, such being accomplished by usual and well-known current application means.

FIG. 1 illustrates the controller 32 with an essentially rectangular shape. In this embodiment, the portions of the controller 34, which are not in, or cannot move into, the magnetic field 52 or the spillages 54 and 56, have no function other than to complete the electric circuit of the controller 34. Accordingly, these end portions of the controller 34 may be curved or semi-circular to reduce mass and electrical resistance.

If the device of the present invention is used horizontally, as shown in FIG. 2, the effect of gravity on the armature 14 will only increase the load on the lower roller guides 26 and 30, and will have no significant effect on the motion of the armature 14. If the CED device 10 is used at an angle to the horizontal, resulting from rotation of the device 10 about an axis perpendicular to the longitudinal axis of the driver 32, there will be a slight increase in longtudinal stress in the roller glides 24, 26, 28 and 30, but this stress increase will have no significant effect on the motion of the armature 14. Should the CED device 10 be used at an angle to the horizontal, resulting from rotation of the device 10 about an axis parallel to the longitudinal axis of the driver 32, the vertical component of the weight of the armature 14 and drive bar assembly 36 and 37, plus the weight of such tools or instruments which may be fixed to the drive bar 36 and 37, plus that part of the driver leads 38 and 40 and the controller leads 42 and 44 (which part is supported by the armature 14), will act in combination as an external force applied to the armature 14. In the CED device 10 of the present invention, compensation for the latter phenomenon is automatically provided, since the armature 14 moves downward until a new equilibrium position is reached, which equilibrium position is not at the geometric center of the pole faces 46 and 48. In such case, the current applied to the driver 32, to move the armature 14 against gravity, will necessarily be different from the current required to move the armature 14 with gravity, and compensation may be achieved automatically, as a function of the angle of rotation, by usual and well-known means.

If the CED device 10 is used in a manner which involves a varying effect of gravity on the armature 14, compensatory electronic control, by usual and well-known means, may be employed to vary the current in the driver 32, so as to achieve the desired equilibrium position and speed and amplitude of movement. This is unlike mechanical devices, wherein accurate compensation for varying components of gravitational forces is difficult to achieve. If desired, a biasing current may be employed to bias the driver 32 so as to keep the armature 14 in a geometrically centered position, and to compensate for fixed or varying components of the gravitational force. Such force is monitored, if desired, by measuring the electric currents induced in the driver 32 by the motion of the armature 14, driver 32 being used as a generator, and only the controller 34 being energized.

The magnetic gap 50 is preferably small so as to increase the strength of the magnetic field 52, and to keep the size of the field spillage 54 and 56 very small. If there were no spillage 54 and 56, the controller 34 could function as a theoretically perfect spring, with the displacement being exactly proportional to the applied force, instead of functioning as an essentially perfect spring. On the other hand, if the magnetic field 52 were perfectly sharp-edged, without spillages 54 and 56, the displacement of the armature 14 would be in increments equal to the thickness (in the direction of motion) of the preferably rectangular wires or metal foil which comprise the conductor of the controller 34. That is, a single turn of the conductor, no matter how thin, would be either in or out of the magnetic field 52. Since the field spillages 54 and 56 vary from full magnetic strength to essentially zero magnetic strength in a relatively short distance, this allows several of the thin foils to be in a magnetic field with a gradient which falls off sharply. This, coupled with the ease of producing very small changes in the currents in the driver 32 and the controller 34, allows an infinite choice of displacements of the armature 14 within the operating range of a specific CED device.

It is clear that a CED device may be embodied in various shapes, sizes, and configurations of the basic elements noted above. However, in such cases, the relationship between driver current and armature displacement may not always be linear. when non-linear current/displacement relationships are required, maximum flexibility may be achieved by electronically varying the driver and/or controller currents, rather than by using specifically shaped CED devices, although such designs are not ruled out.

Should it be required to produce a greater force than is available from a particular single CED device, a stacked array of CED devices may be used, as shown in FIG. 3. Although, as previously noted, the magnetic poles of a CED device may be permanent magnets, electromagnets, pole pieces, etc., for simplicity, the following descriptions and accompanying diagrams will describe permanent magnets, unless otherwise indicated. In FIG. 3, a multiplicity of rectangular planar magnets 74, 76, 78 and 80 are fixed in a stack, parallel and congruent to each other, in serial attraction in a manner similar to that illustrated in FIGS. 1 and 2. Armatures 88, 90 and 92 are provided in the magnetic gaps 82, 84 and 86, between magnets 74, 76, 78 and 80, the armatures 88, 90 and 92 comprising drivers 94, 96 and 98, and controllers 100, 102 and 104. The armatures 88, 90 and 92 are fixed together to a drive bar, which is not shown for clarity, so as to act as a unit. The drivers 94, 96 and 98 are connected electrically, preferably in series, with all currents flowing in the same direction. The number of CED devices arrayed in a stack will be a function of the desired force and the physical characteristics of the three basic elements (magnets, driver and controller) of each CED device. It is clear that the electrical connections to the stack may be made so as to utilize, if desired, fewer than the entire number of units in the stack. It is also clear that a small range of sizes of the basic CED elements (magnets and armatures) may be stocked, and may be easily arranged in stacks so as to provide a wide range of forces and amplitudes of motion, and further that, after use, these elements may be easily disassembled into the basic components for reuse without loss, since the only significant wear will be that of the guides.

Where space considerations require, CED devices may be arranged in tandem, as illustrated in FIG. 4. A multiplicity of CED devices 106, 106a, etc., comprising magnet pairs 108 and 108a, 109 and 109a, etc. (shown in dotted outline), drivers 110, 110a, etc., and controllers, 112, 112a, etc., are arranged in tandem, the magnet pairs 108 and 108a and 109 and 109a, etc., being fixed to a framework (not shown), and the armatures 112, 112a, etc. being connected together by a drive bar 114, 114a, etc., so as to function as a unit. As with the CED devices shown in FIG. 3, the tandem CED devices 106, 106a, etc., may be arranged in such lengths as are desired, and a multiplicity of tandem units may be stocked for use and reuse, as required, especially if standard modular sizes of CED devices are used. It is clear that the driver(s) need not be within the same magnetic field as the controller(s) to which it (they) is (are) fixed, but may have its (their) own magnet pair, and may be fixed to the controller(s), at a distance, by a drive bar.

For simplicity, in all further drawings, a CED device in plan will be indicated symbolically by drawing the outline of the controller, showing the driver as a line, using a dotted outline to indicate the magnet pair, and a rectangle to indicate the controller.

Two or more CED devices may be arranged to act in two non-parallel directions so as to produce planar motion. It is necessary, however, that the basic CED device 10 (see FIG. 1) be modified to permit motion in a direction parallel to the driver 32, as well as motion perpendicular to driver 32. In FIG. 1, driver 32 is slightly longer than the length of magnet pair 16 and 18, as measured in a direction parallel to driver 32. This permits the entire driver 32 to be within the magnetic field 52 and within the field spillages at edges 70 and 72 of magnet pair 16 and 18, and permits connection of the leads 38 and 40 to driver 32 at a point outside the influence of the magnetic lines of force.

FIG. 5 illustrates a basic CED device wherein the driver 115 and the controller 116 are both sufficiently longer than the magnet pair 118 and 120, measured in a direction parallel to the driver 115, so that the operating portions 117 and 117a of the controller 116 will always be within, or be able to move within, the influence of the magnetic field, even when the armature 122 is moved laterally (parallel to the driver) by an outside force. Thus, at any position of the armature 122, within its normal range of movement perpendicular to driver 115, the armature 122 may be moved by an external force in a direction parallel to driver 115 without the conductor of driver 115 or the conductor of controller 116 cutting any magnetic lines of force or changing the number and/or length of conductors in the magnetic field between the magnet pair 118 and 120.

FIG. 6 illustrates a planar CED arrangement 123. Four elongated CED devices 124, 124a, 126 and 126a, each similar to the CED illustrated in FIG. 5, are arranged in a cross array, with the respective magnet pairs 128, 128a, 130 and 130a fixed to a framework (not shown), and with the respective armatures 132, 132a, 134 and 134a fixed to each other with a cross-shaped drive bar 136, so that the armatures 132, 132a, 134 and 134a all move freely as a unit. The magnetic polarities of the magnet pairs 128 and 128a, as well as the electrical polarities and connections of their associated drivers 138 and 138a and controllers 140 and 140a, are so arranged that, when energized, the armatures 132 and 132a move as a unit in the same direction. In the same manner, magnetic and electrical polarities of armatures 134 and 134a are arranged so that they will move as a unit in the same direction. Armature pair 132 and 132a is energized and controlled from two sources of electricity (one source for both of the drivers 138 and 138a, and the other source for both of the controllers 140 and 140a), which sources of electricity are separate and different from the two sources of electricity which energize and control armature pair 134 and 134a (one source being for the drivers 139 and 139a, and the other source being for the controllers 141 and 141a).

Preferably, the four elongated CED devices 124, 124a, 126 and 126a which comprise the planar CED arrangement 123 are matched in size, shape and strength of magnetic field, in size, shape and conductivity of the controllers, in controller size, shape and length in the magnetic field, and in current flow direction, although any mismatch can be corrected electrically. If all four of the units are physically matched, all four controllers 140, 140a, 141 and 141a can be placed in the same electrical circuit, preferably in series, so that the same current flows in each, thereby insuring that the same resistive/restoring force is exerted by each. For the same reason, it is considered preferable that the respective pairs of drivers 138 and 138a, and 139 and 139a, each be in their own respective series circuits to insure uniform thrusts from each member of a pair. In this manner, if CED devices 124 and 124a are energized and CED devices 126 and 126a are not energized, motion will take place in the direction indicated by either arrow 142 or arrow 142a. In a like manner, if CED devices 126 and 126a are energized, motion will take place in the direction indicated by either arrow 144 or arrow 144a.

When all four CED devices 124, 124a, 126 and 126a are energized, motion will take place in a direction determined by the instantaneous vector addition of the force exerted by armature pair 134 and 134a, and the force exerted by armature pair 132 and 132a. If all the other physical and electrical characteristics are constant, the location of the center point 146 of drive bar 136 will be a function of the direction and amperage of the current in driver pair 138 and 138a , as well as that in driver pair 139 and 139a. It is clear that, by varying the direction and amperage of the electric current in each of the driver pairs 138 and 138a, and 139 and 139a, the center point 146 can be quickly and accurately placed at any point within the total range of movement of planar CED device 123. It is also clear that any planar shape, regular or irregular, may be traced by center point 146 by controlling and varying the driver currents. For example, if a sinusoidal alternating current of a specific frequency and a specific maximum voltage is applied to driver pair 138 and 138a, and the same current, 90° out of phase, is simultaneously applied to driver pair 139 and 139a, center point 146 will trace a perfect circle, having a radius which is determined by the maximum voltage supplied, and having a speed of tracing which is function of the frequency of the current.

Figure 7:
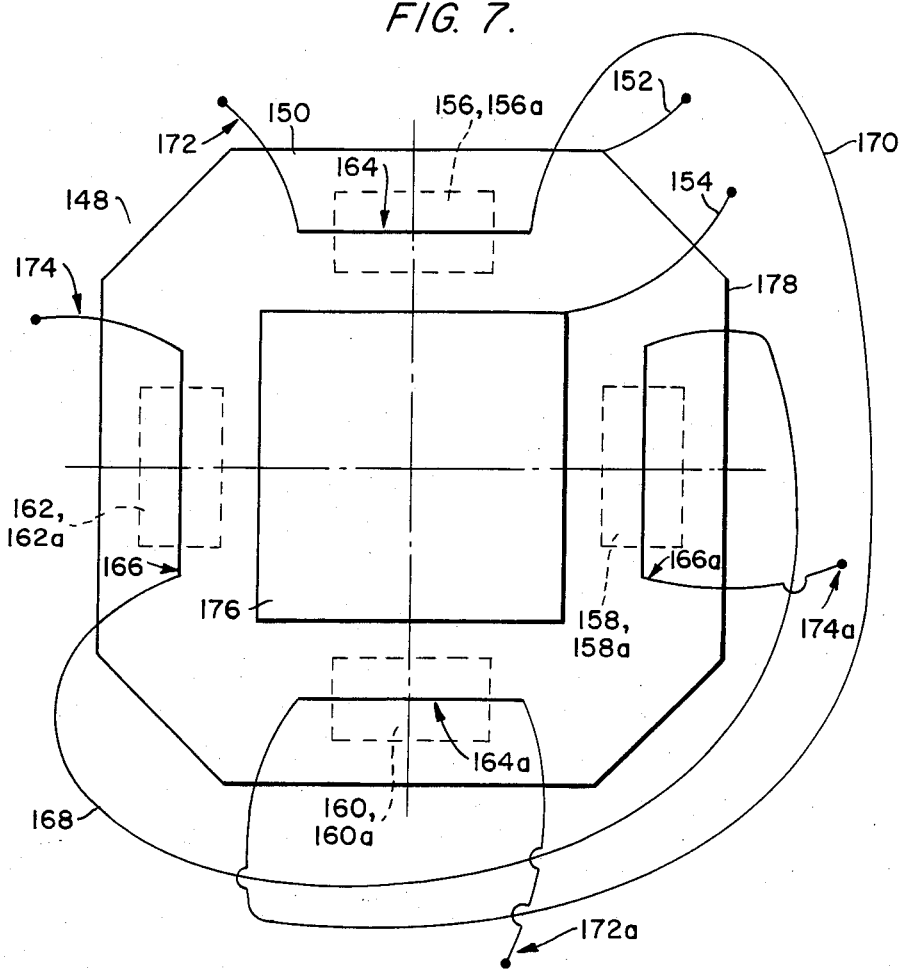
FIG. 7 is a schematic plan view of a planar CED with a single controller.

Instead of utilizing four discrete linear CED devices 124, 124a, 126 and 126a to constitute a planar CED arrangement 123, as shown in FIG. 6, a planar CED device 148 as illustrated in FIG. 7 may be provided. Such a planar CED device 148 comprises a single controller 150 which is energized through leads 152 and 154, as well as four congruent magnet pairs 156 and 156a, 158 and 158a, 160 and 160a, and 162 and 162a (which are shown by dotted outline) arranged with one polarity on one side of armature 178 and the opposite polarity on the other side of armature 178. One pair of drivers 164 and 164a is electrically connected in series by conductor 168 so that the current flow through each driver 164 and 164a is in the same direction relative to the magnetic lines of force. Similarly, driver pair 166, 166a is electrically connected in series by conductor 170 so that the current flow through each driver 166 and 166a is the same direction relative to the magnetic lines of force. Driver pairs 164 and 164a, and 166 and 166a, are energized by leads 172 and 172a, and 174 and 174a, respectively. The magnet pairs 156 and 156a, 158 and 158a, 160 and 160a, and 162 and 162a are fixed to a framework so as to constitute a stator. Fixed to the controller 150 is a drive bar 176, which, together with the drivers 164, 164a, 166 and 166a, comprises the armature 178.

Figure 8:
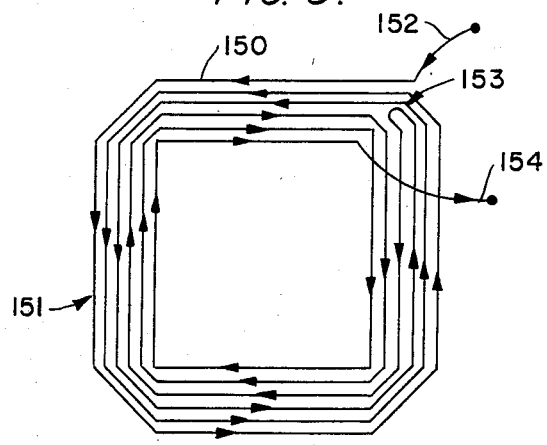
FIG. 8 is a schematic plan view of the direction of the winding of the controller conductor of the planar CED shown in FIG. 7.

The controller 150 is a single continuous conductor 151, in the form of a flat spiral, with all turns insulated from each other and from the drivers 164, 164a, 166, and 166a. The conductor 151 spirals back upon itself (at a point 153 which is not within, and cannot move into, a magnetic field), as shown schematically in FIG. 8, in such a manner that half the turns rotate in one direction and half rotate in the opposite direction, with the segments which are or may be within a magnetic field being straight and parallel to each other and to their respective drivers 164, 164a, 166, and 166a, as previously described. In this manner, when energized through leads 152 and 154, the current in the conductor turns which lie on one side of any driver will flow in the direction opposite to the current in the conductor turns on the other side of that driver, in the same manner as shown in FIG. 1. The length of the drivers 164, 164a, 166 and 166a, and the length of the straight, parallel segments of the controller 150, are such as to allow movement of the armature 178 in any planar direction in the manner illustrated in FIGS. 5 and 6.

Figure 9A:
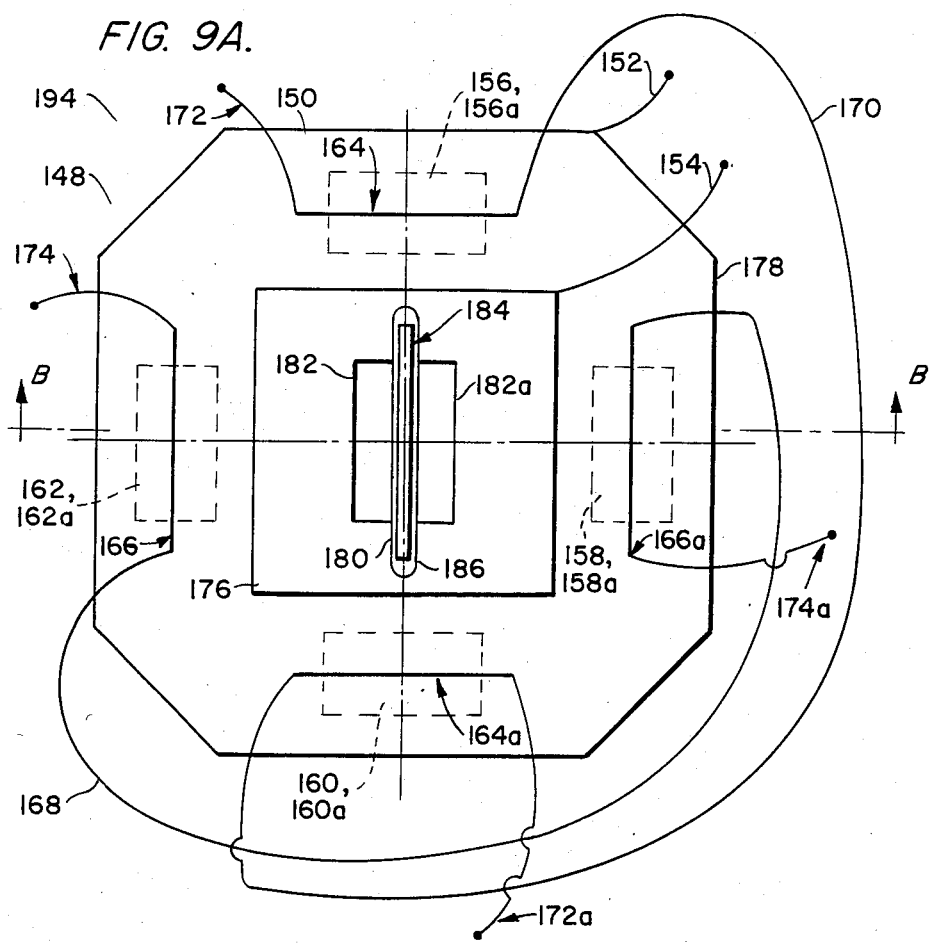
FIG. 9A is a schematic plan view of a three-dimensional CED with a single controller, depicting a basic linear CED fixed at right angles to the plane of motion so as to provide three-dimensional motion.
Figure 9B:
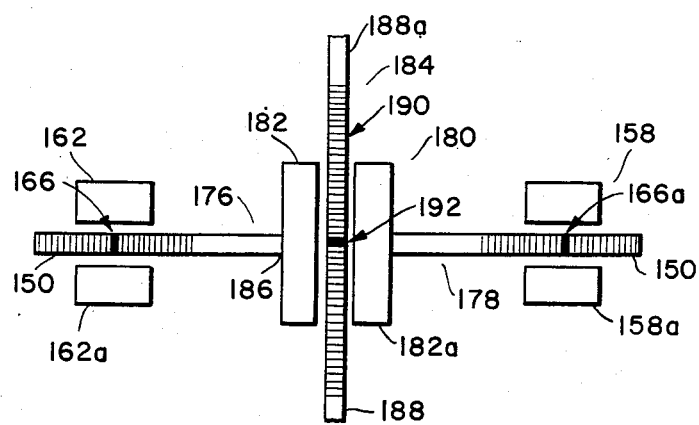
FIG. 9B is a cross-sectional view of the three-dimensional CED illustrated in FIG. 9A, the cross-sectional view being taken along Section B—B of FIG. 9A.

In FIGS. 9A and 9B, a linear CED device 180, similar to that shown in FIGS. 1 and 2, may be fixed to drive bar 176 at right angles to the plane of motion of the planar armature 178, with magnet pair 182 and 182a being fixed to drive bar 176, and with armature 184 of CED 180 being arranged to move freely at right angles to the plane of movement of armature 178 through slot 186 in drive bar 176, thus permitting three-dimensional movement of drive bars 188 and 188a fixed to armature 184.

In FIGS. 9A and 9B, CED device 180 is fixed at right angles to planar armature 178 so that CED device 180 may be moved to any location on a plane within the working range of planar CED device 148, while at the same time armature 184 of CED device 180 may be moved to a desired location in a direction perpendicular to the plane of motion of planar CED device 148. A tool, link or stylus, affixed to drive bars 188 and 188a, may then be rapidly and accurately moved to any point within the working range of three-dimensional CED device 194, or may be made to describe any three-dimensional curve or surface by the previously described motion of armature 184 and armature 178. It is clear that a multiplicity of linear CED devices may be fixed to a planar CED device at various angles to produce a multiplicity and variety of motions simultaneously and/or sequentially. It is also clear that planar CED devices may be formed in a variety of regular and irregular shapes and patterns. It is additionally clear that one or more planar CED devices may be fixed at right angles, or other angles, to other planar CED devices in order to further increase the variety of controlled movements. It is further clear that some shapes, such as circular-disc or annular-disc CED devices, may not produce linear force/displacement relationships, and that such non-linear devices may be used to fulfill special requirements.

Figure 10A:
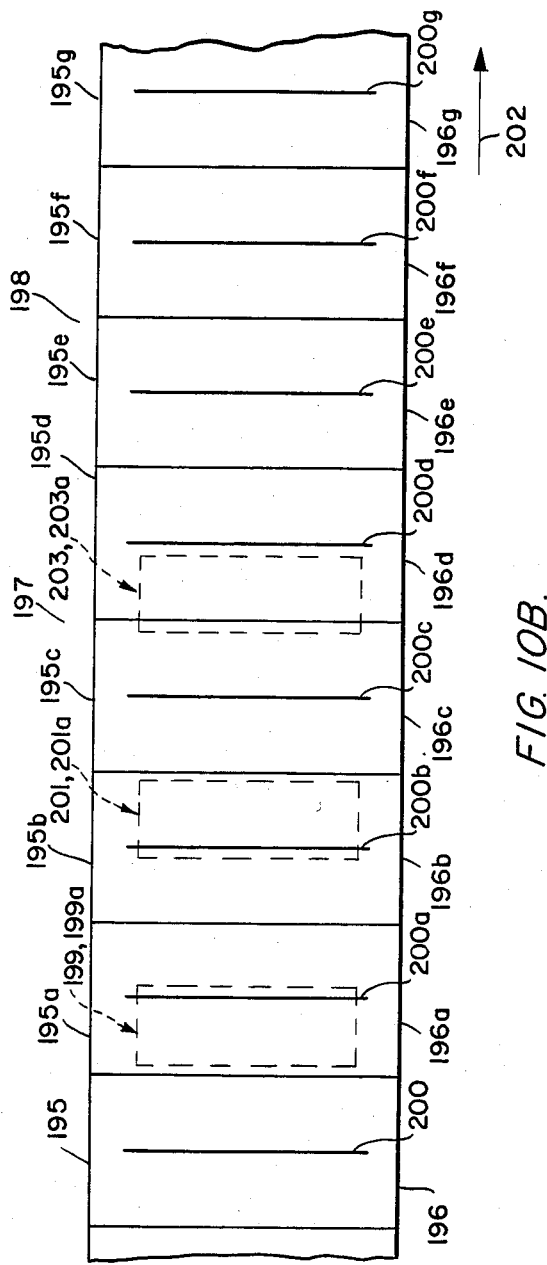
FIG. 10A is a schematic plan view of a continuous-motion CED.

The CED devices illustrated above have been limited in range of movement. Continuous linear or loop controlled motion may be achieved by connecting a multiplicity of linear CED devices in tandem to form a continuous CED arrangement 197, as illustrated in FIG. 10A. A multiplicity of armatures 195, 195a, 195b, 195c, 195d, 195e, 195f, 195g can have their respective controllers 196, 196a, 196b, 196c, 196d, 196e, 196f, 196g fixed rigidly together to form an armature bar 198, which is arranged to pass between three sets of identical stator magnet pairs 199 and 199a, 201 and 201a, and 203 and 203a, which are spaced so that the respective drivers 200, 200a, 200b, 200c, 200d, 200e, 200f, 200g will pass between them in a sequence which permits continuous controlled motion in one direction or the other. As illustrated in FIG. 10A, the armature bar 198 moves to the right, in the direction indicated by arrow 202, due to the force generated by energizing armature 195a. Driver 200a is just about to leave the magnetic field between magnet pair 199 and 199a, while driver 200b has just entered the magnetic field of magnet pair 201 and 201a. At this instant, the current to armature 195a is shut off and the current to armature 195b is turned on with the appropriate direction and amperage to continue the controlled motion of armature bar 198 in the same direction and with the same speed as before.

In a similar manner, when driver 200b is about to leave the magnetic field between magnet pair 210 and 210a, driver 200c will just be entering the magnetic field between magnet pair 203 and 203a. As the motion continues, driver 200c is about to leave magnet pair 203 and 203a, as driver 200 has just entered magnet pair 199 and 199a, and so on. This process will permit large amplitudes of continuous controlled motion in either direction, depending on the sequence of energization of the appropriate armatures and the direction of driver currents.

It is clear that, if the multiplicity of armatures are flexibly connected rather than rigidly connected, a linear or looped chain will result, which chain can move in either direction with accurately controlled rapid motion, provided that, where the chain passes through the stator magnetic fields, the several elements are kept in proper position and alignment by usual and well-known means. It is further clear that if, instead of properly spaced tandem magnet pairs, a set of properly offset stacked magnet pairs (similar to those illustrated in FIG. 3) is used, a triple stacked chain (with the three chains fixed to each other to move as a unit) will also provide continuous movement. It is further clear that, in the stacked continuous chain, the magnet pairs may be in line and the armatures offset to provide the continuous motion.

Figure 10B:
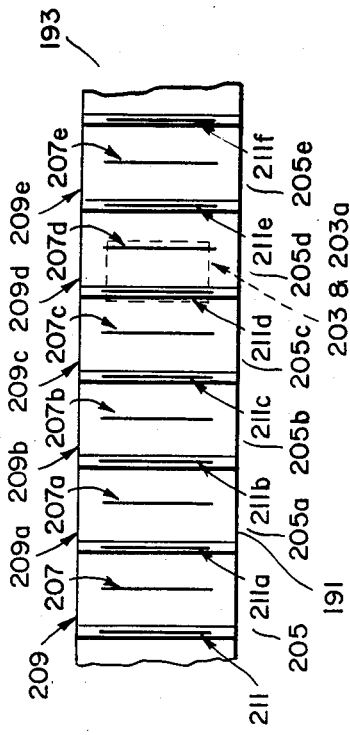
FIG. 10B is a schematic plan view of a continuous-motion CED with a single pair of stator magnets.

FIG. 10B illustrates a continuous CED device 193, which is similar to the continuous CED device 197 illustrated in FIG. 10A, except that only one magnet pair 203 and 203a (which is slightly longer, in the direction of motion, than in a basic linear CED device) is used. A series of armatures 205, 205a, 205b, 205c, 205d, 205e are fixed together to form a bar 191, with their respective drivers 207, 207a, 207b, 207c, 207d, 207e and their respective controllers 209, 209a, 209b, 209c, 209d, 209e passing through the magnetic field between magnet pair 203 and 203a. In between the armatures 205, 205a, 205b, 205c, 205d, 205e are additional drivers 211, 211a, 211b, 211c, 211d, 211e, 211f which may be energized independently of each other and independently of drivers 207, 207a, 207b, 207c, 207d, 207e. The magnet pair 203 and 203a is sufficiently long, as measured in the direction of motion of the armature bar 191, so that, as driver 207d is leaving the magnetic field between magnet pair 203 and 203a, driver 211d is entering the magnetic field. With motion toward the right, in the direction shown by arrow 202, when driver 207d is deenergized, driver 211d is energized with the appropriate amperage and direction of current flow, and, at the same time, the direction of current flow in controller 209d is reversed, and controller 209c is energized, with its current flow being in the direction opposite to the normal direction, so that the controlled movement to the right continues. To clarify, while armature 205d is within the magnetic field between magnet pair 203 and 203a, the normal direction of current flow in controller 209d is such that the current in the conductor turns to the left of driver 207d, tends to move the assembly to the left, away from driver 207d, and toward additional driver 211d. In a similar manner, the normal direction of current flow in controller 209c is such that the current in its conductor turns to the right of driver 207c tends to move the assembly to the right, away from its driver 207c, and toward additional driver 211d. If the normal direction of current flow in controllers 209c and 209d is reversed, then the portion of controller conductor turns of controller 209d which is to the right of additional driver 211d will tend to move the assembly to the right, away from additional driver 211d, and the portion of conductor turns of controller 209c which is to the left of additional driver 211d will tend to move the assembly to the left, away from additional driver 211d. It is clear that additional driver 211d, and its adjacent portions of controllers 209c and 209d, when properly energized, will themselves function as a basic linear CED device. In this manner, by sequentially energizing the appropriate drivers and the additional drivers with the appropriate amperages and directions of current flow, while energizing, and at the proper time reversing the direction of current flow in, the controllers adjacent to the additional drivers, controlled continuous motion will result.

If the basic linear CED device 10 (which is illustrated in FIG. 1) is bent, in the plane of motion, into an arc of a circle, similar to a segment of an annular disc, a CED device 10a which will produce controlled motion along a circular arc is realized. (Because of the similarity, the same numbering system used for FIG. 1 will be used for FIG. 11, with the addition of suffixes.)

Figure 11:
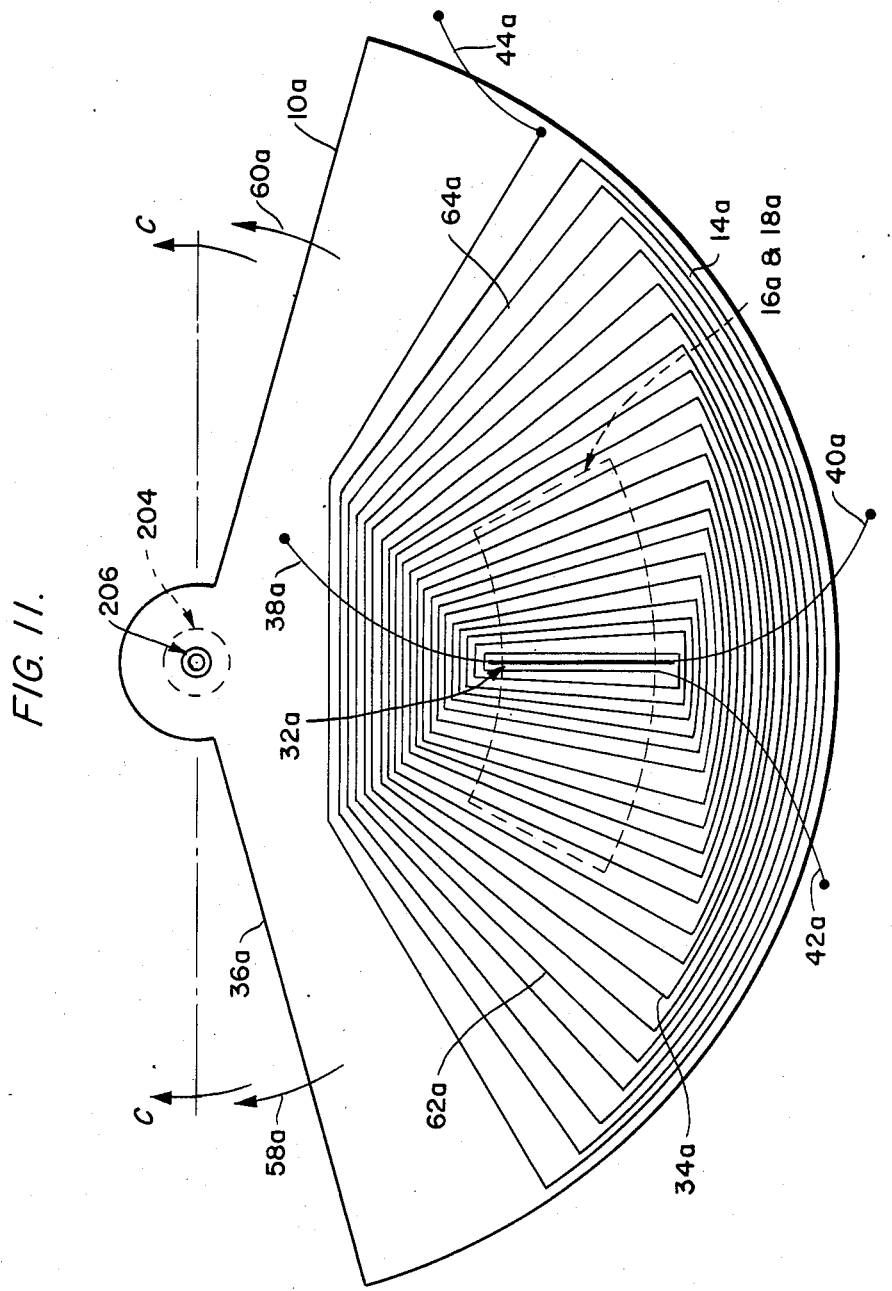
FIG. 11 is a plan view of a rotary CED.

In FIG. 11, developed circular arc section C—C is similar to section A—A in FIG. 1, and appears as in FIG. 2.

Magnet pair 16a and 18a comprises an annular arc segment magnet, which is so polarized as to result in an attractive relationship between its poles, and which is so fixed that armature 14a moves freely between the poles. Armature 14a comprises straight radial driver 32a and curved controller 34a. Driver 32a is energized through leads 38a and 40a connected thereto. Controller 34a is energized through leads 42a and 44a connected thereto. The aforementioned electrical leads are preferably connected to slip rings 204, which are fixed to bearing 206, and around which the rotary CED device 10a rotates the drive bar 36a in the direction indicated by arrow 58a or arrow 60a. The portions 62a and 64a of controller 34a, which may pass through the magnetic field between magnet pair 16a and 18a, have straight radial conductors, so that the thrust (which is at right angles to the conductor) is always tangential to an arc of a circle centered on bearing 206, and movement takes place along an arc of that circle.

It is clear that one or more additional rotary CED devices may be fixed to drive bar 36a in the same plane as CED device 10a so as to provide greater rotational force and to balance the rotating masses. It is further clear that a multiplicity of rotary CED devices may be stacked in a manner similar to that shown in FIG. 3 so as to provide greater force. If, in such a stack of rotary CED devices, the CED devices are offset angularly with respect to each other, continuous controlled rotary motion may be achieved by energizing the proper rotary CED devices sequentially in a manner similar to that illustrated in FIGS. 10A and/or 10B. It is further clear that a linear, planar, and/or rotary CED device, or a multiplicity of such, may be fixed to a rotary CED device at right angles, or other angles, with respect to the plane of motion, to provide complex, three-dimensional motion.

Figure 12:
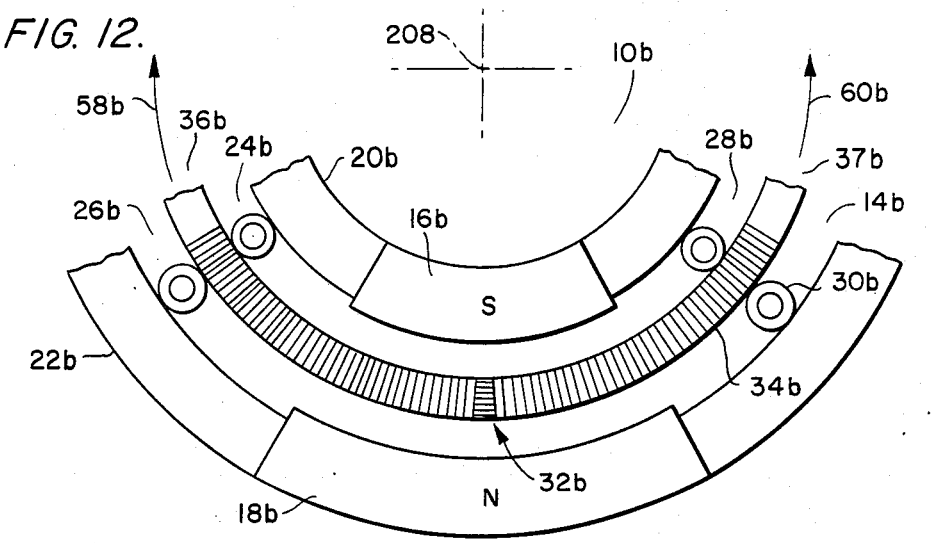
FIG. 12 is a sectional view of a cylindrical or spherical CED.

In FIG. 12, a basic linear CED device, such as shown in FIG. 2, is bent into the form of a right circular cylinder with the long axis of the cylinder parallel to the driver 32b, so that a rotary CED device 10b is formed. (Because of similarity, the same reference numerals used for FIGS. 1 and 2 are used for FIG. 12, with the addition of suffixes.) Armature 14b comprises a straight driver 32b which is parallel to the central axis 208 of the cylindrical section, curved controller 34b, and drive bars 36b and 37b, and is constrained to rotate along the directions indicated by arrows 58b and 60b by roller guides 24b, 26b, 28b and 30b within support framework 20b and 22b between magnet pair 16b and 18b. The armature 14b, when properly energized as hereinbefore described, makes controlled movements along the directions indicated by arrow 58b or arrow 60b. It is clear that one or more matching cylindrical CED devices, similar to CED device 10b, may be installed with axis 208 as a center, with the stator parts fixed to each other, and with the moving parts fixed to each other, so as to increase the force of the device and to balance the rotating masses. It is also clear that the several armatures can be electrically connected to slip rings at the center of rotation to energize the several drivers and controllers, and that the several parts may be so sized and offset relative to each other that they may be energized sequentially so as to provide continuous controlled rotary motion in a manner similar to that heretofore described. It is further clear that one or more linear, planar and/or rotary CED devices may be fixed at right angles, or other angles, with respect to the drive bars 36b and/or 37b to produce a variety of three-dimensional motions. Furthermore, if the planar CED device 148, shown in FIG. 7, instead of the linear CED device 10 illustrated in FIG. 2, were bent into the form of a segment of a right circular cylinder, the moving parts could move in a direction parallel to the long axis of the cylinder at the same time that they moved in a circumferential direction.

If, instead of bending the planar CED device 148, shown in FIG. 7, into the shape of a right circular cylinder, it is bent into the shape of a segment of a sphere, controlled motion in any direction along the surface of the sphere can be achieved. It is clear that motion along any shape of constant curvature may be achieved in this manner. It is further clear that any of the combinations and variations previously described may be applied to a doubly-curved CED device. It is further clear that, with no current in the driver, any CED device will function as an essentially perfect spring, resisting motion in a controlled mode along any path within its range and path of motion.

Figure 13A:
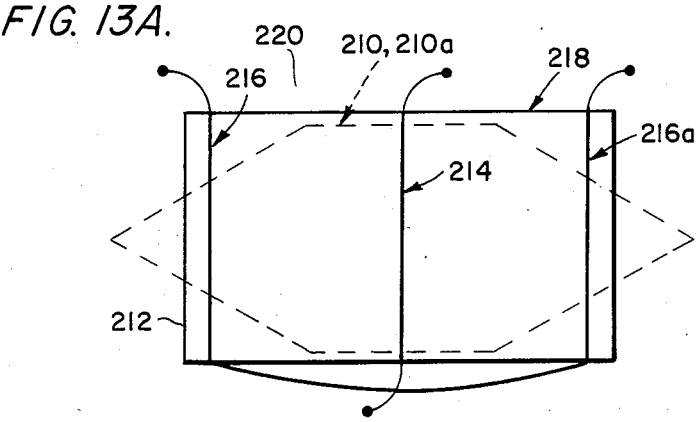
FIG. 13A is a plan view of a shaped-stator-magnet CED.

FIG. 13A illustrates an embodiment of the linear CED device which does not use a spiral conductor. The shaped-magnet CED device 220 has a magnet pair 210 and 210a, shown in dotted outline, which is shaped like a rectangle with a triangle at each end, the triangles preferably being isosceles triangles of equal dimensions, with the altitude to the base adjacent to the rectangular portion being, preferably, at least equal in length to the length of the rectangular portion measured in the direction of motion of the armature 212. The armature 212 comprises a driver 214 and a controller pair 216 and 216a, fixed together by a drive bar 218. The controller pair 216 and 216a comprises a pair of electrical conductors connected in series and energized with direct current in such direction of current flow that each conductor tends to move out of the magnetic field in a direction away from the driver and away from the other controller conductor. It is clear that, if the armature 212 is moved by an applied force to the right, controller conductor 216a will have a shorter length, and controller conductor 216 will have a proportionately longer length, of conductor between the magnet pair 210 and 210a, and that the thrust to the right, due to the interaction of the current in controller conductor 216a with the magnetic field between shaped-magnet pair 210 and 210a, will be less than the thrust to the left due to conductor 216. This difference is directly proportional to the displacement, thus producing another embodiment of the essentially perfect spring heretofore described.

If instead of supplying an outside displacing force, the displacing force is supplied by a current through the driver 214, which is controlled in amperage and direction of flow, another embodiment of the device of the invention is produced in the form of the shaped-magnet CED device 220. It is clear that this embodiment may be used in all the various manners and arrays heretofore described: tandem, stack, planar, three-dimensional, flat rotary, curved rotary, doubly-curved, etc. It is further clear that the shape of the end or middle portion of the magnets may be of various proportions, and may be placed in various locations with respect to each other, and, in order to achieve various force/displacement relationships, they may be of curved or irregular shape, or of other shapes, in plan and/or section.

Figure 13B:
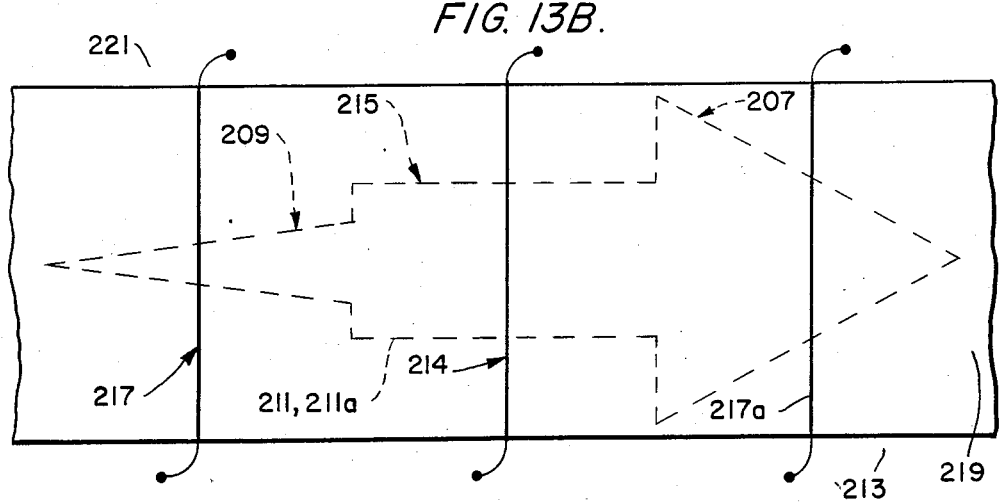
FIG. 13B is a plan view of an asymmetrical shaped-stator-magnet CED.
Figure 19:
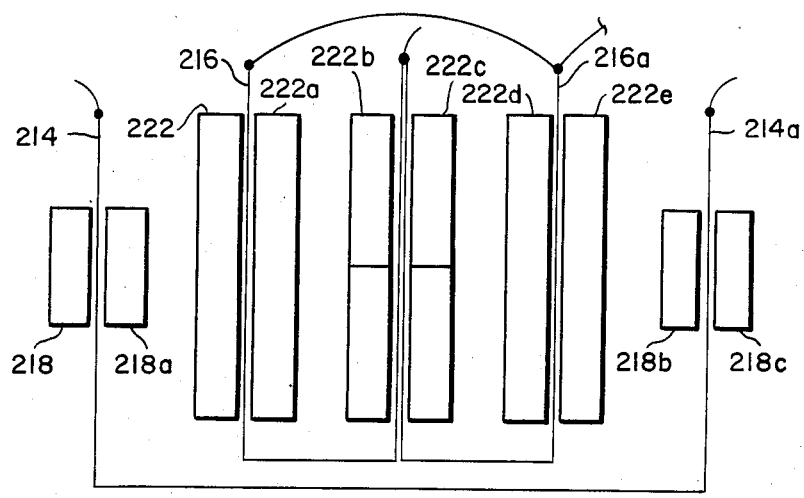
FIG. 19 is a right-hand view of the ultra-compact CED shown in FIG. 8.

FIG. 13B illustrates an asymmetrical-shaped-magnet CED device 221, which is similar to the shaped-magnet CED device 220, except that the non-rectangular ends 207 and 209 of magnet pair 211 and 211a are shaped differently from each other, and that the controllers 217 and 217a are connected independently of each other to a source of electricity, rather than being connected in series. In FIG. 13B, for illustration, the base of the triangular end section 209 of magnet pair 211 and 211a, which is directly adjacent to the rectangular section 215 of magnet pair 211 and 211a, is half the width, measured in a direction parallel to the driver 214, of the central rectangular section 215, and similarly, the base of triangular section 207 is twice the width of rectangular section 215. The length of conductor of controller 217 within the magnetic field of end section 209 is one-quarter of the length of the conductor of controller 217a within the magnetic field of end section 207 at any position of the armature 213 within the working range of asymmetrical-shaped-magnet CED device 221. For equilibrium, and for the proper functioning of the device as a CED device, the current in controller 217 will have to be four times as great as the current in controller 217a, with due consideration being given to the length of each conductor influenced by the end spillages of the magnetic field. Thus, it is clear that, if an asymmetric stator magnet pair is used, whether by design or by inaccuracy of manufacture, the CED device can easily be made to function properly by adjusting the electric currents in the several conductors.

FIG. 14 illustrates a variation of the shaped-magnet CED device 220 shown in FIG. 13A. The shaped-magnet pair 222 and 222a comprises a pair of rectangular sections 224 and 224a, flanked by a pair of matching triangular sections 226 and 226a, and 228 and 228a, and fixed together by framework 230, with the apices of the triangular magnet sections 226 and 226a, and 228 and 228a, pointing inwardly toward the rectangular magnet section 224 and 224a. All magnet sections are shown in dotted outline for clarity. The armature 212 comprises driver 214 and controller pair 216 and 216a, fixed together by a drive bar 218. (Where there is no elemental change, the same reference numerals as used in FIG. 13A are used in FIG. 14 since, with the exception of the direction of end magnet apices and controller current direction, the two devices are similar.) The controller pair 216 and 216a is energized so that the thrust on each controller conductor 216 and 216a is towards the driver 214, and towards each other, so that, if force is applied to the armature 212 so as to move it to the right, the length of controller conductor 216a in the magnetic field between triangular magnet sections 228 and 228a will be greater than the length of controller conductor section 216 in the magnetic field between triangular magnet sections 226 and 226a. Therefore, the thrust toward the left will be greater than the thrust to the right in direct proportion to the displacement. If the displacing force is supplied by an electric current through the driver 214, which current is controlled in amperage and direction of flow, another embodiment of a shaped-magnet CED device 220a is produced. It is clear that this embodiment may be used in the same manner and in the same array that shaped-magnet CED device 220 is used. For simplicity, when the term shaped-magnet CED device is used, the shaped-magnet CED device 220 of FIG. 13 is intended and is to be considered.

FIG. 15 illustrates a rod or chain shaped-magnet CED device 232 which is similar to the continuous CED device 197 illustrated in FIG. 10. A series of drivers 214b, 214c, 214d, 214e, 214f and 214g, with their respective controller pairs 216b and 216bb, 216c and 216cc, 216d and 216dd, 216e and 216ee, 216f and 216ff, and 216g and 216gg, which are similar to the assembly of driver 214 and controller 216 and 216a illustrated in FIG. 13A, are arranged in an overlapping array and are fixed to drive bar 218a to constitute an armature 212a. Since the several conductors are all single conductors, the array may be fixed in a single layer or plane, even though overlapped. The armature 212a is arranged to move freely between the shaped-magnet pair 210 and 210a. The spacing of the several drivers and their controllers is such that controlled continuous linear or loop motion in either direction is available. In FIG. 15, armature 212a is moving toward the right under the thrust of driver 214e, and is controlled by controller conductors 216e and 216ee. As driver 214e is about to leave the area between the rectangular sections of shaped-magnet pair 210 and 210a, and its respective controller conductors 216e and 216ee are about to leave the area between the triangular sections of magnet pair 210 and 210a, driver 214d has just entered the area between the rectangular section of shaped magnet pair 210 and 210a, and its respective controller conductors 216d and 216dd have just entered their respective areas between the triangular sections of shaped-magnet pair 210 and 210a. If the electric current provided to driver 214e and its respective controller conductors 216e and 216ee is cut off and if, simultaneously, driver 214d and its controllers 216d and 216dd are appropriately energized, the armature 212a will continue its controlled movement to the right. In a like manner, if the other driver/controller elements are sequentially energized, controlled movement will continue in the desired direction. It is clear that, in any embodiment of the continuous CED device, a multiplicity of stator magnet assemblies may be used in tandem or stacked array to increase the resultant force achieved thereby.

In FIG. 13A, the shaped-magnet CED device is three times as long as the amplitude of motion, measured in the direction of motion. In FIG. 2, the basic linear CED device is twice as long as the amplitude of motion similarly measured. FIGS. 16 and 17 illustrate a shaped-magnet CED device which is only twice as long as the amplitude of motion. Referring to FIG. 13A, it is noted that the driver 214 moves only within the rectangular portion of shaped-magnet pair 210 and 210a. The controllers 216 and 216a travel only within the triangular portions of shaped-magnet pair 210 and 210a. By separating the rectangular and the triangular portions, and by stacking them vertically, the device can be shortened in the direction of motion. In FIG. 16, the plan view, and FIG. 17, the right side view, rectangular magnet pairs 218 and 218a, and 218b and 218c, have drivers 214 and 214a, respectively, between them. The triangular sections are placed base-to-base to form a rhomboidal shaped-magnet pair 220 and 220a, with controllers 216 and 216a being between the pair of magnets. The controllers 216 and 216a and the drivers 214 and 214a are fixed together by a drive bar (which, for the sake of clarity, is not shown.)

Figure 18:
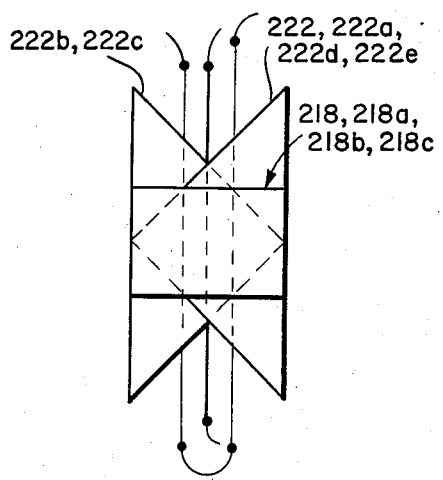
FIG. 18 is a plan view of an ultra-compact shaped-stator-magnet CED.

In a similar manner, FIGS. 18 (plan view) and 19 (right hand view) illustrate a shaped-magnet CED device having a length which is the same as the amplitude of motion, measured in the direction of motion. The rhomboidal shaped-magnet pair 220 and 220a, shown in FIG. 16, is divided into triangular magnet pairs 222 and 222a, 222b and 222c, and 222d and 222e, which are stacked between rectangular magnet pairs 218 and 218a, and 218b and 218c, in a balanced array. The center triangular magnet pair 222b and 222c is stacked between the outer triangular magnet pairs 222 and 222a, and 222d and 222e, and is rotated 180 degrees with respect to these outer magnet pairs so that its apices point in a direction opposite to that of the others. Drivers 214 and 214a are between the rectangular magnet pairs 218 and 218a, and 218b and 218c, respectively, while controllers 216 and 216a are between triangular magnet pairs 222 and 222a, and 222d and 222e, respectively, and both controllers 216 and 216a pass between the center triangular magnet pair 222b and 222c, arrayed so that there will be equal thrusts in both directions, and so that there will be no unbalanced moments. The moving parts are fixed together by a drive bar (not shown).

Figure 20:
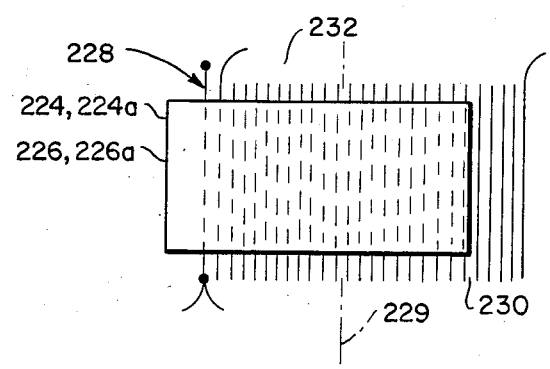
FIG. 20 a plan view of a linear CED with a one-sided controller.
Figure 21:
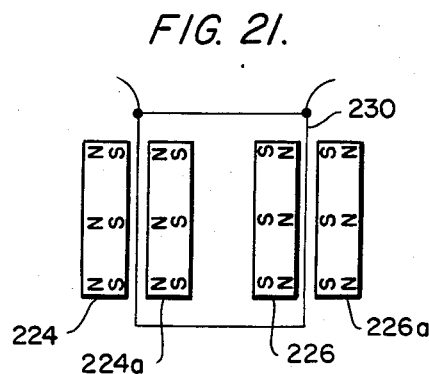
FIG. 21 is a right-hand view of the CED of FIG. 20.
Figure 22:
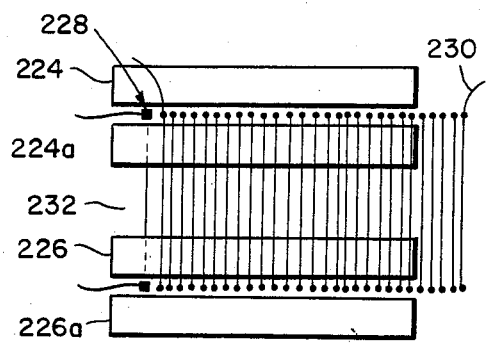
FIG. 22 is a front view of the CED of FIG. 20.

The basic linear CED device, shown in FIGS. 1 and 2, can be modified so that the length of the device is the same as the amplitude of motion, as illustrated in FIGS. 20, 21, 22 and 23, which are a plan view, a right hand view, a front elevation view, and a left hand view, respectively, of the device. Two pairs of bar magnets 224 and 224a, and 226 and 226a, are fixed parallel, adjacent and congruent with respect to each other, and also in attractive polarity with respect to each other. The facing sides of magnets 224a and 226 have the same polarity, as shown, so that the direction of the magnetic lines of force between magnets 224 and 224a is opposite to that of magnet pair 226 and 226a. A driver 228 is arranged between magnet pair 224 and 224a, and passes between magnet pair 226 and 226a in a direction opposite to the direction in which it passes between magnet pair 224 and 224a. In a similar manner, the controller 230 is arranged as a continuous conductor making a generally rectangular spiral between magnet pairs 224, 224a and 226, 226a, so that it passes in one direction between magnet pair 224 and 224a, and in the opposite direction between magnet pair 226 and 226a. Driver 228 and controller 230 are fixed to each other by a drive bar (not shown) to form an armature 232. When the driver 228 is energized, it tends to move either to the right or to the left, depending on the direction of current flow. The controller 230 is energized so that it will move in a direction away from the driver 228, which, in FIG. 20, is to the right. The driver 228 is initially energized by a biasing current having a direction which is such that it tends to move the driver 228 in a direction away from the controller 230, that is, to the left in FIG. 20. The amperage of the current in the driver 228 and the controller 230 is such that, when the armature 232 is in its initial equilibrium position (that is, with the driver 228 at the transverse center line 229 of magnet pairs 224 and 224a, and 226 and 226a), and when one-half of the controller extends to the right from between the magnet pairs 224 and 224a and 226 and 226a, the CED device is in equilibrium. If the current in the controller 230 is kept constant, the armature 232 may be moved to the left or to the right by increasing or decreasing the current in the driver 228.

FIGS. 24 and 25 illustrate a magnet-controller CED device wherein the controller comprises magnets, preferably bar magnets. A magnet pair 234 and 234a is fixed in an adjacent, parallel, congruent array and in attractive polarity with respect to a driver 236, the latter being arranged between the magnet pair 234 and 234a, as heretofore described. The driver 236 is fixed to a drive bar 240, along with a pair of matched controller magnets 238 and 238a, which are in replusive polarity with respect to the stator magnet pair 234 and 234a. When the driver 236 is at its center equilibrium position, the controller magnets 238 and 238a are half in and half out of the magnetic field between the magnet pair 234 and 234a. Since the controller magnets 238 and 238a are in repulsive polarity with respect to the adjacent faces of magnetic pair 234 and 234a, each controller magnet 238 and 238a tends to move out of the magnetic field away from the magnet pair 234 and 234a, and therefore away from the driver 236, and away from each other. Controller magnet 238 tends to move to the left, and controller magnet 238a tends to move to the right. The greater the length of a magnet in a repulsive field, the greater the thrust which tends to move it out of the field. The more controller magnet 238 moves to the right, the more of it is in the magnetic field, and thus the greater is the force moving it to the left. Similarly, the more that controller magnet 238a moves to the right, the less of it is in the magnetic field, and the smaller is the force that tends to move it to the right. Thus, if armature 242 is moved to the right due to the current in the driver 236, the restoring force increases due to the imbalance of controller magnets 234 and 234a.

FIGS. 26 and 27 illustrate another embodiment of the magnet-controller CED device, in which all elements of the device shown in FIGS. 24 and 25 are the same, except that the controller magnets 244 and 244a are of triangular shape in plan. This increases the change in repulsive forces acting on the controller magnets 246 and 246a due to their being at greater or lesser depth in the magnetic field.

FIG. 28 illustrates another embodiment of the magnet-controller CED device, wherein all elements of the device are the same as that shown in FIGS. 24 and 25, and/or FIGS. 26 and 27, except that the cross-section of the controller magnets 246 and 246a is triangular, or of other shape which is not rectangular. This further increases the rate of change of magnetic repulsive force acting on the controller magnets 246 and 246a as they are moved into or out of the magnetic field.

FIG. 29 illustrates another embodiment of the magnet-controller CED device, wherein the elements of the device shown in FIGS. 24 and 25, and/or FIGS. 26 and 27, and/or FIG. 28, are the same, except that the magnet pair 248 and 248a is not of rectangular cross-section. This serves to further increase and change the rate of change of magnetic repulsive forces acting on the magnet-controllers 238 and 238a as they are forced deeper into, or further out of, the magnetic field. It is clear that there are a variety of cross-sectional shapes of stator magnets which may be used with any of the controllers described heretofore, and which may be used to provide a variety of types of motion.

It is clear that, in all magnet controller CED devices, the stator magnets and the controller magnets may be of the same polarity without changing the operation or effectiveness of the CED device. That is, if the stator magnets are arrayed in repulsion (for example, with adjacent faces having N polarity), and the controller magnets are N poles, the outward thrusts on the controller magnets will still be the same function of the displacement as in the devices previously shown, in which devices the stator magnets were arrayed in attractive relationship and the adjacent faces of the magnet controllers were in repulsive polarity with respect to the adjoining faces of the stator magnets.

It is finally clear that, in any of the devices shown, the armature may be fixed and the stator may move. It is also clear that a CED device will function as a generator if an electrical load or sink is connected to the driver leads in lieu of a source of current, and if a force is applied to the armature to move the driver within the magnetic field of the stator magnets. For magnet-controller CED devices, such as those shown in FIGS. 24, 25, 26, 27, 28 and 29, if a force applied to the armature is sufficient to overcome the resistance of the controller magnets, the armature will move, generating a current of electricity within the driver. If the force is then released the controllers will move the armature back to the equilibrium position, generating a current in the driver, which current is opposite in direction to the current generated by the original application of the displacing force. The energy used to overcome the resistance of the controllers will be stored and returned with little loss by the return of the armature to the equilibrium position. The displacing force may be applied repeatedly to produce an alternating current in the driver without the use of commutation or slip rings, and the force may be unidirectional or bi-directional, with the controller functioning as a magnetic flywheel, storing the energy to restore the armature, as well as the device applying the displacing force, to the original position.

In a similar manner, the other CED devices discussed above, which devices use electrical conductors as controllers, may be used to generate electricity, with the force being applied linearly, in a plane, in three dimensions, in a rotary surface mode, or in a curved surface mode, etc., depending on which embodiment of the device of the invention is used, provided that the controller of each device is energized in the proper direction. However, the conductor-controller embodiments have an advantage with respect to the magnet-controller CED devices. Specifically, in the conductor-controller embodiments, the current in the controller may be arranged so that it is turned off during the time that the displacing force is applied to the armature, thus decreasing the force reguired to move the armature, and then it may be turned on again at that point of the motion when it is desired to return the armature to the equilibrium position. Further, if a conductor-controller CED device is fixed to a source of displacing force, which either will restore itself to its equilibrium position or will continue its motion (in the case of rotary or loop CED devices), the controller conductors (in addition to the driver conductor) may also be used as generators of electricity. Further, the multiple conductor type of controller (such as illustrated in FIGS. 1, 11, 12 and 22) will produce alternating currents and have a maximum voltage which is significantly greater than the voltage produced in the driver conductor, since many more lines of force are cut by the controller conductor. Under these conditions, it is clear that the asymmetrical shaped-magnet CED device illustrated in FIG. 13B will generate currents with three different maximum voltages.

It is also clear that the driver may be connected to a source of alternating current (having a frequency and maximum voltage such that the driver stays within its normal range of movement), and may be used to drive the controller(s), which are connected to an electrical load or sink, as a generator. In such case, the maximum voltage generated by the CED device will be greater than that applied to the driver, so that the CED device may be used as a voltage step-up device or transformer. The asymmetrical shaped-magnet CED device shown in FIG. 13B, when driven by the driver, will produce two electric currents from its controllers, one smaller in voltage than that applied to the driver, and one greater in voltage, thus functioning as a step-up and step-down transformer simultaneously.

It is also clear that the controller can be used to move the armature, using the driver as a generator, by starting the controller assembly from an off-center position and reversing the usual direction of current flow, then reversing it again to the normal direction, and continuing the process, allowing the inertia of the armature, with the controller current off, to carry the armature past the center equilibrium position. In this mode, the CED device will function as a step-down transformer for all cases where the length of the controller conductor in the magnetic field, at maximum position, is greater than the length of the driver conductor in the magnetic field.

Finally, with a CED device attached to a source of force, such as a reciprocating engine, the CED device may have both the driver and the controller energized so as to produce motion in the same direction, with a sufficiently strong burst of electricity so that the CED device functions as a starter for the engine, and then the driver may be energized (so as to oppose the motion of the engine at the end of the stroke), with the controller being energized in the normal manner, so as to store energy and release energy at the end of the stroke. This will return the engine's piston to its firing position again, sequentially and in the proper rhythm, so as to function as an electromagnetic flywheel which has less mass than the normal rotating flywheel and starter. Further, this CED flywheel can function as a generator during the power stroke, and thus permit operation as a straight-acting, free piston engine. This reduces the mass of the assembly for the connecting rod, wristpin, etc. and allows a straight stroke as opposed to motion which will waste the angular component of the crank action of the flywheel, also reducing the wear on the piston/cylinder due to elimination of the side thrust from the angled connecting rod, and also reducing vibration due to crankshaft action. Moreover, by eliminating the balancing weights for the cranks, mass is also reduced.

It is clear that, for a CED device in the generator mode, the displacing force need not be applied by a material member, but may be applied by a field or an acceleration. For example, an inertial guidance system may be comprised of three linear CED devices at right angles to each other (or two planar or one three-dimensional CED device) and three rotary CED devices at right angles to each other (or two spherical or one three-dimensional rotary CED device), with the added advantage that the resisting/restoring force may be adjusted (by control of the current in the controllers) either to an ultra-sensitive mode or one which can measure extreme changes in acceleration. The generated currents may be measured by CED meters, recorded by CED oscillographs, and used for correction, trimming, control or adjustment by CED relays, modulating controls, servos, selsyns, and the like.

While preferred forms and arrangements have been shown in illustrating the invention, it is to be understood that various modifications would be obvious to one of skill in the art, and that the scope of the invention is only limited by the appended claims.

I claim:

1. A controlled electric drive device for effecting continuously controlled planar motion in two dimensions of an armature with variable planar displacement, position, velocity, and pattern of travel, comprising:
   a plurality of controlled electric drives coupled to said armature, generally arranged in a single plane and having different orientations therein;
   each controlled electric drive including
      a pair of magnetic poles of different polarity arranged adjacent to each other so as to have a relatively narrow gap in between and providing therein a magnetic field defined by magnetic lines of force having a first generally uniform linear direction;
      driver conductor means disposed in said gap and having a long axis in a second linear direction perpendicular to said first direction for receiving a driver current, said driver conductor means being responsive to said driver current and to said magnetic lines of force so as to be moved from an original position in a third linear direction at a right angle to said first and second directions, said driver conductor means being connected to said armature;
      controller conductor means operably connected to said driver conductor means and insulated from it for receiving a control current, said controller conductor means having a first and a second portion disposed on opposing sides of an imaginary plane through said long axis of said driver conductor means and parallel to said first direction;
      said first and second portion of said controller conductor means being at least partially disposed in the magnetic field having lines of force generally parallel to said first direction, said first and second portion of said controller conductor means also being arranged such that current flowing in said first portion flows in a direction opposite to current flowing in said second portion, said controller conductor means is operative to effect control of motion in said third direction responsive to said control current and the associated magnetic field;
      said controller conductor means being connected to said dirver conductor means and is operative to effect control in the continuous displacement, position, and velocity of said driver conductor means through the entire range of motion of said driver conductor menas in said third direction, for realizing selective patterns of travel;
   said plurality of controlled electric drives being angularly positioned in said plane, relative to each other, whereby control in the continuous displacement, position, and velocity of said armature in two dimensional planar motion is continuously effected throughout the operative range of motion of said armature, and selective patterns of two dimensional motion may be realized.

2. A controlled electric drive device for effecting continuously controlled spacial motion in three dimensions of an armature with variable spacial displacement, position, velocity, and pattern of travel, comprising:
   a plurality of controlled electric drives coupled to said armature, generally arranged in a single plane and having different orientations therein;
   at least one additional controlled electric drive coupled to said armature and angularly positioned with respect to said plane;
   each controlled electric drive including
      a pair of magnetic poles of different polarity arranged adjacent to each other so as to have a relatively narrow gap in between and providing therein a magnetic field defined by magnetic lines of force having a first generally uniform linear direction;

driver conductor means disposed in said gap and having a long axis in a second linear direction perpendicular to said first direction for receiving a driver current, said driver conductor means being responsive to said driver current and to said magnetic lines of force so as to be moved from an original position in a third linear direction at a right angle to said first and second direction, said driver conductor means being connected to said armature;

controller conductor means operable connected to said driver conductor means and insulated from it for receiving a control current; said controller conductor means having a first and a second portion disposed on opposing sides of an imaginary plane through said long axis of said driver conductor means and parallel to said first direction, said first and second portion of said controller conductor means being at least partially disposed in the magnetic field having lines of force generally parallel to said first direction, said first and second portion of said controller conductor means also being arranged such that current flowing said first portion flows in a direction opposite to current flowing in said second portion, said controller conductor means is operative to effect control of motion in said third direction responsive to said control current and the associated magnetic field;

said controller conductor means being connected to said driver conductor means and is operative to effect control in the continuous displacement, position, and velocity of said driver conductor means throughout the entire range of motion of said driver conductor means in said third direction;

said plurality of controlled electric drives being angularly positioned in said plane, relative to each other, and said at least one additional controlled electric drive being angularly positioned relative to the plane of said plurality of controlled electric drives, whereby control in the continuous displacement, position, and velocity of said armature in three dimensional spacial motion is continuously effected throughout the operative range of motion of said armature, and selective patterns of three dimensional motion may be realized.

3. A controlled electric drive device for effecting continuously controlled linear motion of an armature with variable linear displacement, position, velocity, and pattern of travel, comprising:

a controlled electric drive including a pair of magnetic poles of different polarity arranged adjacent to each other so a to have a relatively narrow gap in between and providing therein a magnetic field defined by magnetic lines of force having a first generally uniform linear direction;

driver conductor means disposed in said gap and having a long axis in a second linear direction perpendicular to said first direction for receiving a driver current, said driver conductor means being responsive to said driver current and to said magnetic line of force so as to be moved from an original position in a third linear direction at a right angle to said first and second directions, said driver conductor means being connected to said armature;

controller conductor means operably connected to said driver conductor means and insulated from it for receiving a control current; said controller conductor means having a first and a second portion disposed on opposing sides of an imaginary plane through said long axis of said driver conductor means and parallel to said first direction, said first and second portion of said controller conductor means being at least partially disposed in the magnetic field having lines of force generally parallel to said first direction, said first and second portion of said controller conductor means also being arranged such that current flowing in said first portion flows in a direction opposite to current flowing in said second porition, said controller conductor means in operative to effect control of motion in said third direction responsive to said control current and the associated magnetic field;

said controller conductor means being operably connected to said driver conductor means and is operative to effect control in the continuous displacement, position, and velocity of said driver conductor means throughout the entire range of motion of said driver conductor means in said third direction;

whereby control in the continuous displacement, position, and velocity of said armature in linear motion is continuously effected throughout the operative range of motion of said armature, and selective patterns of linear motion of the armature may be realized.

4. A controlled electric drive device as recited in claim 1, 2, or 3 wherein each said driver conductor means comprises a straight conductor section along said long axis; and each said controller conductor mean comprises an electrical conductor in a planar, generally oblong form.

5. A controlled electric drive device as recited in claim 4, wherein said pair of magnetic poles defining said gap is non-rectangular.

6. A controlled electric drive device as recited in, claims 1, 2 or 3 wherein said pair of magnetic poles terminate in opposing faces and each face is of angularly shaped cross-section having at least three corners.

7. A controlled electric drive device as recited in claim 1, 2 or 3, wherein said narrow gap is of angularly shaped cross-section having only one axis of symmetry and at least six corners, and said stright conductor section being disposed in a direction perpendicular to said axis of symmetry.

8. A controlled electric drive device as recited in claim 1, 2 or 3, wherein each said controller conductor means comprises a plurality of conductor turns around said straight conductor section of the same controlled electric drive.

9. A controlled electric drive as recited in claim 1, 2 or 3, wherein in each controlled electric drive, said magnetic field in which said first and second portion of said controller conductor means are at least partially disposed, is generated via the same magnetic poles defining said narrow gap.

10. A controlled electric drive as recited in claim 1, 2 or 3, wherein in each controlled electric drive, said magnetic field in which said first and second portion of said controller conductor means are at least partially disposed, is generated via a pair of magnetic poles different from said magnetic poles defining said narrow gap.

11. A controlled electric drive device as recited in claim 1, 2 or 3, wherein
   at all times throughout the controlled motion of said armature, said straight conductor section of said driver conductor means remains entirely within a corresponding said narrow gap, and at least a part of either said first or second portion of each controller conductor means remaining within a corresponding said magnetic field.

12. A controlled electric drive as recited in claim 1, 2, or 3, wherein
   each said controller conductor means comprises a plurality of conductor turns around a section of said driver conductor means along said long axis in the same controlled electric drive.

13. A controlled electric drive device as recited in claims 1, 2 or 3 wherein:
   said pair of magnetic poles terminate in opposing faces and each face is of an angularly shaped cross-section having at least six corners.

14. A controlled electric drive device for effecting continuously controlled arcuate motion of an armature about a pivot with variable arcuate displacement, position, velocity, and pattern of travel, comprising:
   a controlled electric drive including
      a pair of magnetic poles of different polarity and having generally arcuate faces arranged adjacent to each other so as to have a relatively narrow gap in between, and providing therein a magnetic field defined by magnetic lines of force having a first generally uniform direction;
      driver conductor means disposed in said gap and having a long axis in a second direction perpendicular to said first direction and lying along a radial line extending from said pivot for receiving a driver current, said driver conductor means being responsive to said driver current and to said magnetic lines of force so as to be moved from an original position in an arcuate third direction about said pivot relative to said first and second directions, said driver conductor means being connected to said armature;
      controller conductor means operably connected to said driver conductor means and insulated from it and lying along at least one line radiating from said pivot for receiving a control current, said controller conductor means having a first and a second portion disposed on opposing sides of an imaginary plane through said long axis of said driver conductor means, said first and second portion of said controller conductor means being at least partially disposed in the magnetic field having lines of force in said first direction, said first and second portion of said controller conductor means also being arranged such that current flowing in said first portion flows in a direction opposite to current flowing in said second portion, said controller conductor means is operative to effect control of motion in said third direction responsive to said control current and the associated magnetic field;
      said controller conductor means being connected to said driver conductor means and is operative to effect control in the continuous displacement, position, and velocity of said driver conductor means throughout the entire range of arcuate motion of said driver conductor means in said third direction;
   whereby control in the continuous displacement, position, and velocity of said armature in arcuate motion is continuously effected throughout the operative range of motion of said armature, and selective patterns of arcuate motion of the armature may be realized.

15. A controlled electric drive device for effecting continuously controlled motion of at least a partial cylindrical segment armature with variable cylindrical displacement, position, velocity, and pattern of travel, comprising:
   a plurality of controlled electric drives coupled to said armature, generally arranged upon said armature and having different angular orientations therein;
   each controlled electric drive including
      a pair of magnetic poles of different polarity arranged adjacent to each other so as to have a relatively narrow gap in between and providing therein a magnetic field defined by magnetic lines of force having a first generally uniform radial direction with respect to the at least partial cylindrical segment armature;
      driver conductor means disposed in said gap and having an axis in a second direction upon the at least partial cylindrical segment for receiving a driver current, said driver conductor means being responsive to said driver current and to said magnetic lines of force so as to be moved from an original position in a third direction relative to said first and second directions, said driver conductor means being connected to said armature;
      controller conductor means operably connected to said driver conductor means and insulated from it for receiving a control current, said controller conductor means having a first and a second portion disposed on opposing sides of an imaginary plane through said long axis of said driver conductor means,
      said first and second portion of said controller conductor means being at least partially disposed in the magnetic field having lines of force in said first direction, said first and second portion of said controller conductor means also being arranged such that current flowing in said first portion flows in a direction opposite to current flowing in said second portion, said controller conductor means is operative to effect control of motion in said third direction responsive to said control current and the associated magnetic field;
      said controller conductor means being connected to said driver conductor means and is operative to effect control in the continuous displacement, position, and velocity of said driver conductor means throughout the entire range of motion of said driver conductor means in said third direction, for realizing selective patterns of travel;
   said plurality of controlled electric drives being angularly positioned, relative to each other, whereby control in the continuous displacement, position, and velocity of said armature in cylindrical motion is continuously effected throughout the operative range of motion of said armature, and selective patterns of cylindrical motion may be realized.

16. A controlled electric drive device arrangement comprising a plurality of devices as recited in claims 1, 2, 3, 14, or 15 arranged in a stacked array.

17. A controlled electric drive arrangement comprising a plurality of devices as recited in claims 1, 3, 13 or 14 arranged in a stacked array.

18. A controlled electric drive device for effecting continuously controlled spacial motion of an armature fashioned into a surface of revolution with variable spacial displacement, position, velocity, and pattern of travel, comprising:
  a plurality of at least two controlled electric drives coupled to said armature, each controlled electric drive having a mutually angular orientation;
  each controlled electric drive including,
    a pair of magnetic poles of different polarity arranged adjacent to each other so as to have a relatively narrow gap in between and providing therein a magnetic field defined by magnetic lines of force having a first direction;
    driver conductor means being connected to said armature and disposed in said gap and having an arcuate axis conforming to the armature and said driver conductor extending in a second direction perpendicular to said first direction for receiving a driver current, said driver conductor means being responsive to said driver current and to said magnetic lines of force so as to be moved from an original position in a third direction relative to said first and second direction;
    controller conductor means operably connected to said driver conductor means and insulated from it for receiving a control current, said controller conductor means being arcuate and conforming to the armature having a first and a second portion disposed on opposing sides of an imaginary plane through said long axis of said driver conductor means, said first and second portion of said controller conductor means being at least partially disposed in the magnetic field having lines of force in said first direction, said first and second portion of said controller conductor means also being arranged such that current flowing in said first portion flow in a direction opposite to current flowing in said second portion, said controller conductor means is operative to effect control of motion in said third direction responsive to said control current and the associated magnetic field;
    said controller conductor means being operably connected to said driver conductor means and is operative to effect control in the continuous displacement, positon, and velocity of said driver conductor means throughout the entire range of motion of said driver conductor means;
  said plurality of controlled electric drives being angularly positioned relative to each other, whereby control in the continuous displacement, position, and velocity of said armature in spacial motion is continuously effected throughout the operative range of motion of said armature, and selective patterns of spacial dimensional motion may be realized.

19. A controlled electric drive as recited in claims 1, 2, 3, 14, 15, or 18 and further comprising:
  means for inhibiting said driver current to constitute said device as an electric spring.

20. A controlled electric drive device for effecting continuously controlled planar motion in two dimensions of an armature with variable planar displacement, position, velocity, and pattern of travel, comprising:
  a plurality of controlled electric drives connected to said armature, and being generally arranged in a single plane and having different angular orientations therein;
  each controlled electric drive including,
    a pair of magnetic poles of different polarity arranged adjacent to each other so as to have a relatively narrow gap in between pole faces, and providing therein a magnetic field defined by magnetic lines of force having a generally uniform linear direction between the pole faces,
    driver conductor means disposed in said gap and having a long axis extending generally perpendicular to said magnetic lines of force for receiving a driver current, said driver conductor means being responsive to said driver current and to said magnetic lines of force so as to be moved from an original position in a linear direction at a right angle to said long axis and the magnetic lines of force, said driver conductor means being connected to said armature, and
    controller conductor means connected to said armature and being electrically insulated from said driver conductor means for receiving a control current, said controller conductor means having a first and a second portion disposed on opposing sides of an imaginary plane extending through said long axis of said driver conductor means and parallel to the magnetic lines of force,
    said first and second portion of said controller conductor means being at least partially disposed in the magnetic field of said poles,
    said first and second portion of said controller conductor means also being arranged such that current flowing in said first portion flows in a direction opposite to current flowing in said second portion,
    said controller conductor means being operative to effect control of motion perpendicular to the long axis of said driver conductor,
    said controller conductor means being operably connected to said driver conductor means to effect control in the continuous displacement, position, and velocity of said driver conductor means throughout the entire range of motion of said driver conductor means; and
  said plurality of controlled electric drives being angularly positioned in said plane, relative to each other, whereby control in the continuous displacement, position, and velocity of said armature in two dimensional planar motion is continuously effected throughout the operative range of motion of said armature, and selective patterns of two dimensional motion may be realized.

21. A controlled electric drive device as recited in claim 20 wherein:
  said plurality of controlled electric drives comprises at least two controlled electric drives mutually arranged at a right angle to operably effect planar motion of said armature.

22. A controlled electric drive device for effecting continuously controlled spacial motion in three dimenions of an armature assembly with variable spacial displacement, position, velocity, and pattern of travel, comprising:
  a plurality of at least three controlled electric drives connected to said armature assembly, each controlled electric drive having a mutually angular orientation and being arranged in a non-planar array;
  each controlled electric drive including
    a pair of magnetic poles of different polarity arranged adjacent to each other so as to have a relatively narrow gap in between pole faces, and providing therein a magnetic field defined by magnetic lines of force having a generally uniform direction between the pole faces,
    driver conductor means disposed in said gap and having a long axis extending generally perpendicular to said magnetic lines of force for receiving a driver current, said driver conductor means being responsive to said driver current and to said magnetic lines of force so as to be moved from an original position in a direction at a right angle to said long axis and the magnetic lines of force, said driver conductor means being connected to said armature assembly,
    controller conductor means connected to said armature and being electrically insulated from said driver conductor for receiving a control current, said controller conductor means having a first and a second portion disposed on opposing sides of an imaginary plane extending through said long axis of said driver conductor means and parallel to said, magnetic lines of force,
      said first and second portion of said controller conductor means being at least partially disposed in the magnetic field of said poles,
      said first and second portion of said controller conductor means also being arranged such that current flowing in said first portion flows in a direction opposite to current flowing in said second portion,
      said controller conductor means being operative to effect control of motion perpendicular to the long axis of said drive conductor, and
      said controller conductor means being operably connected to said driver conductor means to effect control in the continuous displacement, position, and velocity of said driver conductor means throughout the entire range of motion of said driver conductor means; and
  said plurality of controlled electric drives being mutually angularly connected to said armature assembly relative to each other, whereby control in the continous displacement, position, and velocity of the armature assembly in three dimensional spacial motion is continuously effected throughout the operative range of motion of said armature assembly, and selective patterns of three dimensional motion may be realized.

23. A controlled electric drive device for effecting continuously controlled linear motion of an armature with variable linear displacement, position, velocity, and pattern of travel, comprising:
  a controlled electric drive including
    a pair of magnetic poles of different polarity arranged adjacent to each other so as to have a relatively narrow gap in between pole faces, and providing therein a magnetic field defined by magnetic lines of force having a generally uniform linear direction between the pole faces;
    driver conductor means disposed in said gap and having a long axis extending generally perpendicular to said magnetic lines of force for receiving a driver current, said driver conductor means being responsive to said driver current and to said magnetic lines of force so as to be moved from an original position in a linear direction at a right angle to said long axis and the magnetic lines of force, said driver conductor means being connected to said armature; and
    controller conductor means connected to said armature and being electrically insulated from said driver conductor means for receiving a control current, said controller conductor means having a first and second portion disposed on opposing sides of an imaginary plane extending through said long axis of said driver conductor means and parallel to the magnetic lines of force,
      said first and second portion of said controller conductor means being at least partially disposed in the magnetic field of said poles,
      said first and second portion of said controller conductor means also being arranged such that current flowing in said first portion flows in a direction opposite to current flowing in said second portion,
      said controller conductor means being operative to effect control of motion perpendicular to the long axis of said driver conductor,
      said controller conductor means being operably connected to said driver conductor means to effect control in the continuous displacement, position, and velocity of said driver conductor means throughout the entire range of motion of said driver conductor means,
  whereby control in the continuous displacement, position, and velocity of said armature in linear motion is continuously effected throughout the operative range of motion of said armature, and selective patterns of linear motion of the armature may be realized.

24. A controlled electric drive device as recited in claims 20, 22, 23 wherein:
  each of said pair of opposing pole faces of each controlled electric drive is configured in cross-section with at least six edges.

25. A controlled electric drive device as recited in claims 20, 22, or 23 wherein:
  each driver conductor means comprises a single conductor; and
  each controller conductor means comprises a single conductor on each side of said drive conductor means.

26. A controlled electric drive device for effecting controlled motion of an armature with variable displacement, position, velocity, and pattern of travel, comprising:
  a controlled electric drive including
    a pair of magnetic poles of different polarity arranged adjacent to each other and terminating with opposing end faces and having a relatively narrow gap in between and providing therein a magnetic field defined by magnetic lines of force having a first generally uniform direction;

driver conductor means connected to said armature and being disposed in said gap and having a long axis in a second direction for receiving a driver current, said driver conductor means being responsive to said driver current and to said magnetic lines of force so as to be moved from an original position in a third direction to said first and second directions;

controller conductor means operably connected to said driver conductor means and insulated from it for receiving a control current, said controller conductor means having at least a first portion disposed upon one side of an imaginary plane extending through said long axis of said driver conductor means, said at least a first portion of said controller conductor means being at least partially disposed within the magnetic field of said magnetic poles, said controller conductor means being operable to effect controlled movement of said armature in said third direction;

said controller conductor means being operably connected to said driver conductor means and operative to effect control in the displacement, position, and velocity of said driver conductor means through the range of motion of said driver conductor means in said third direction;

whereby control in the displacement, position, and velocity of said armature is effected throughout the operative range of motion of said armature, and selective patterns of motion of the armature may be realized.

* * * * *